US012650398B2

(12) United States Patent
Hashemi

(10) Patent No.: US 12,650,398 B2
(45) Date of Patent: Jun. 9, 2026

(54) METHOD AND SYSTEM FOR DETECTING AND LOCATING DEFECTS TO A COATING ON A METALLIC OBJECT

(71) Applicant: COPSYS TECHNOLOGIES INC., Logy Bay (CA)

(72) Inventor: Farzad Hashemi, Halifax (CA)

(73) Assignee: COPSYS TECHNOLOGIES INC., Newfoundland and Labrador (CA)

( * ) Notice: Subject to any disclaimer, the term of this patent is extended or adjusted under 35 U.S.C. 154(b) by 97 days.

(21) Appl. No.: 18/265,190

(22) PCT Filed: Dec. 3, 2021

(86) PCT No.: PCT/IB2021/061321
§ 371 (c)(1),
(2) Date: Jun. 2, 2023

(87) PCT Pub. No.: WO2022/118284
PCT Pub. Date: Jun. 9, 2022

(65) Prior Publication Data
US 2024/0035997 A1 Feb. 1, 2024

Related U.S. Application Data

(60) Provisional application No. 63/121,103, filed on Dec. 3, 2020.

(51) Int. Cl.
*G01N 27/20* (2006.01)
*G01N 27/04* (2006.01)

(52) U.S. Cl.
CPC ........... *G01N 27/20* (2013.01); *G01N 27/041* (2013.01)

(58) Field of Classification Search
CPC ...... G01N 17/02; G01N 27/20; G01N 27/205; F17D 5/06
See application file for complete search history.

(56) References Cited

U.S. PATENT DOCUMENTS

| | | | | |
|---|---|---|---|---|
| 2,124,579 A | * | 7/1938 | Knerr | G01N 27/904 |
| | | | | 324/226 |
| 5,087,873 A | * | 2/1992 | Murphy | G01V 3/06 |
| | | | | 324/71.2 |
| 6,716,327 B1 | * | 4/2004 | De La Prieta | G01N 27/4074 |
| | | | | 204/426 |
| 2011/0011751 A1 | * | 1/2011 | Betti | G01N 17/02 |
| | | | | 205/775.5 |
| 2018/0187314 A1 | * | 7/2018 | Hashemi | C23F 13/18 |
| 2020/0378885 A1 | * | 12/2020 | Yang | G01N 17/04 |

FOREIGN PATENT DOCUMENTS

| | | |
|---|---|---|
| CN | 208791772 U | 4/2019 |
| WO | WO-2006004733 A1 | 1/2006 |
| WO | WO-2016203368 A1 | 12/2016 |
| WO | WO-2018203221 A1 | 11/2018 |

* cited by examiner

*Primary Examiner* — Feba Pothen
(74) *Attorney, Agent, or Firm* — Perry + Currier Inc.

(57) ABSTRACT
A system for introduction of digital integrity self-sensing of corrosion-protective coatings to remotely detect, locate and monitor coating barrier failure in real time to identify corrosion prone hotspots before corrosion damage of protected substrate materials occurs.

18 Claims, 20 Drawing Sheets

METHOD AND SYSTEM FOR DETECTING AND LOCATING DEFECTS TO A COATING ON A METALLIC OBJECT

FIELD

The present invention relates to the introduction of digital integrity self-sensing functionality to corrosion protective coatings, including remote detection, location and monitoring progression of coating barrier failure on metallic objects, that exposes substrate surfaces to degradation from corrosion.

BACKGROUND

Corrosion is an unrelenting, critical cause of degradation and aging that limits the useful safe operating life of industrial plant and public infrastructure. Effective management of Corrosion is critical component of industrial and public maintenance and integrity management programs.

Visual inspection is the primary means of detecting corrosion, which may be difficult, expensive and untimely for effective maintenance of assets that are difficult to access for visual inspection for example due to physical enclosure, isolation or remote location.

Corrosion Under Insulation (CUI) is a leading cause of failure of process piping systems and significant contributor to process safety and environmental incident risks in hydrocarbon production, petrochemicals and other process industries. Thermal insulation and protective cladding are installed over pressurized piping systems, vessels and containers to support effective industrial chemical processes. Detection and management of surface corrosion under insulation requires costly and disruptive removal, and subsequent reinstatement, of cladding and insulation, periodically, to permit visual inspection and repairs.

Some non-invasive technologies, such as radiography, eddy current, ultrasonic, etc. have been applied to detect possible corrosion damage, but these techniques can only infer the likelihood of corrosion to guide visual inspection programs, detect corrosion damage only after it has occurred, and typically require human operation in close proximity to protected assets.

SUMMARY

It is an aspect of the present invention to provide a system for detecting and locating defects to a coating on a metallic object that exposes the metallic object to an electrolyte.

Impressed Current Cathodic Protection (ICCP) is a well-known and reliable process for protecting metallic objects, particularly steel, against corrosion. ICCP has been applied successfully for many years to protect valuable and safety critical assets in numerous industries, including marine transportation vessels, ocean and coastal infrastructure, and pipelines.

Coating-integrated ICCP technology can be used in this system to digitally and remotely detect, locate and monitor protective coating barrier failures that can lead to initiation of corrosion and to enable live digital twining of otherwise digitally inactive surfaces. The coating-integrated ICCP is activated when the anode coating and the insulating layer are damaged, exposing the cathode to the electrolyte (water, seawater, moisture etc.), establishing an electrochemical circuit which initiates electrical current and provides notification of coating damage, channel cased location and severity based upon magnitude of current draw.

The above aspects can be attained by a system that includes an electron source for applying current to the metallic object. The metallic object is covered with an electrically insulating coating, which is further covered by a covering anode. The metallic object serves as the cathode so that, when the covering anode and the electrically insulating coating are damaged, an electrolyte transmits current between the cathode and the covering anode. The covering anode is connected to a sensor, which is in turn connected to a processor. Based on the current that is transmitted through metallic object to the electrolyte, from the electrolyte to the covering anode, from the covering anode to the sensor, and from the sensor back to the electron source, the processor detects the damage to the coating as well as the exposed areas of the metallic substrate to the electrolyte.

In some examples, the sensor may comprise an electrically conductive strip. The processor may be programmable with a location of the electrically conductive strip. The processor may be configured to locate the defect in the covering anode and the electrically insulating coating based on the current transmitted by the electrically conductive strip. The processor may also be configured to generate location information based on the location of the defect, where the location is expressed relative to the location of the electrically conductive strip. The location information may be output at an indicator connected to the processor.

In some examples, the processor is programmable for different currents, voltages, and arrangements of the electrically conductive strip.

In some examples, the electrically conductive strip encircles the metallic object. In other examples, the electrically conductive strips are arranged in a geometrically patterned array.

In further examples, a topcoat is applied over the electrically conductive strip.

In yet further examples, the electrically insulating coating and the covering anode and applied to two sides of a metallic object.

In some examples, the electrically conductive strip comprises a carbon fiber fabric strip.

In further examples, the system includes a graphite member for electrically connecting the electron source to the electrically conductive strip.

It is a further aspect of this disclosure to provide a method for detecting and locating defects to a coating on a metallic object. At least part of the metallic object is coated with an electrically insulating coating which is further covered by a covering anode. Current is applied by an electron source to the metallic object. The electron source is further connected to a sensor embedded in the covering anode, and a processor detects the current transmitted by the sensor. If no current is detected when current is applied to the metallic object, a processor determines that the covering anode and electrically insulating coating have no defects. If current is detected in the sensor when current is applied to the metallic object, the processor determines that the covering anode and electrically insulating coating have a defect which permits an electrolyte to electrically connect the covering anode to the metallic object. In response to a positive determination, an indicator connected to the processor indicates that the electrically insulating coating and the covering anode have a defect.

In one example, the method includes monitoring the coating on the metallic object to determine if defects have changed over time. In addition to the steps described above, the processor measures a first current transmitted by the sensor when current is applied by the electron source to the metallic object. That measurement is stored in memory at the processor. After repeating the steps of applying current and detecting current, the processor measures a second current transmitted by the sensor when current is applied by the electron source to the metallic object. That measurement is also stored in memory at the processor. The processor then compares the first and second measurements to determine whether the defect has grown.

In another example, the processor is programmed with a location for the electrically conductive strip. In response to detecting current at the sensor, the processor locates the defect based on the detected current and generates location information that is expressed relative to the location of the sensor.

In a further example where the system includes a plurality of sensors, the processor can locate the defect by determining which sensor conducts the highest amount of current of all the sensors. The processor then identifies the location of the defect as being proximate to that sensor.

In a yet further example where the sensor encircles the metallic object, the processor determines which sensor conducts the second highest amount of current and identifies the location of the defect as being between the two sensors that conduct the highest and second highest amount of current.

In another example, a first group of sensors are aligned in one direction and a second group of sensors are aligned perpendicularly to the first group. The method may include selecting the highest conducting sensor from the first group, and the highest conducting sensor from the second group. The defect can be located proximate to the intersection of the two sensors identified.

In a further example, the processor is programmed with the location of the sensor and, after locating the defect, the processor generates location information for the defect that is expressed relative to the location of the sensor.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION

The present disclosure provides a system for detecting and locating a defect to a coating on a metallic object that exposes the metallic object to an electrolyte, therefore predicting corrosion in the metallic object.

The system includes a covering anode that is painted over an electrically insulating coating that is painted over a metallic object that serves as the cathode. The covering anode is connected to an electron source with at least one sensor interspersed throughout the covering anode. The sensor may include at least an electrically conductive strip. The cathode is also connected to the electron source so that, when the covering anode and the electrically insulating layer are damaged and the metallic surface is exposed and come to contact to the electrolyte such as water, moisture, seawater, etc., the electrochemical cell and Impressed Current Cathodic Protection (ICCP) circuit is activated. When the circuit is complete, a microcontroller can measure current transmitted by the electrically conductive strip and send a signal that the covering anode and electrically isolating layer are damaged. Additionally, the ICCP system is activated to protect the exposed metallic object against corrosion. Furthermore, the processor can locate the area in which the covering anode and electrically isolating layer are damaged. The amount of current transmitted will be highest from the electrically conductive strip that is closest to the damage. This can considerably limit the total area for visual inspection and non-destructive inspection (NDI). Damage to the covering anode and electrically isolating layer can be detected and repaired more quickly and repairs to the metallic object itself can be avoided.

Figure 1:
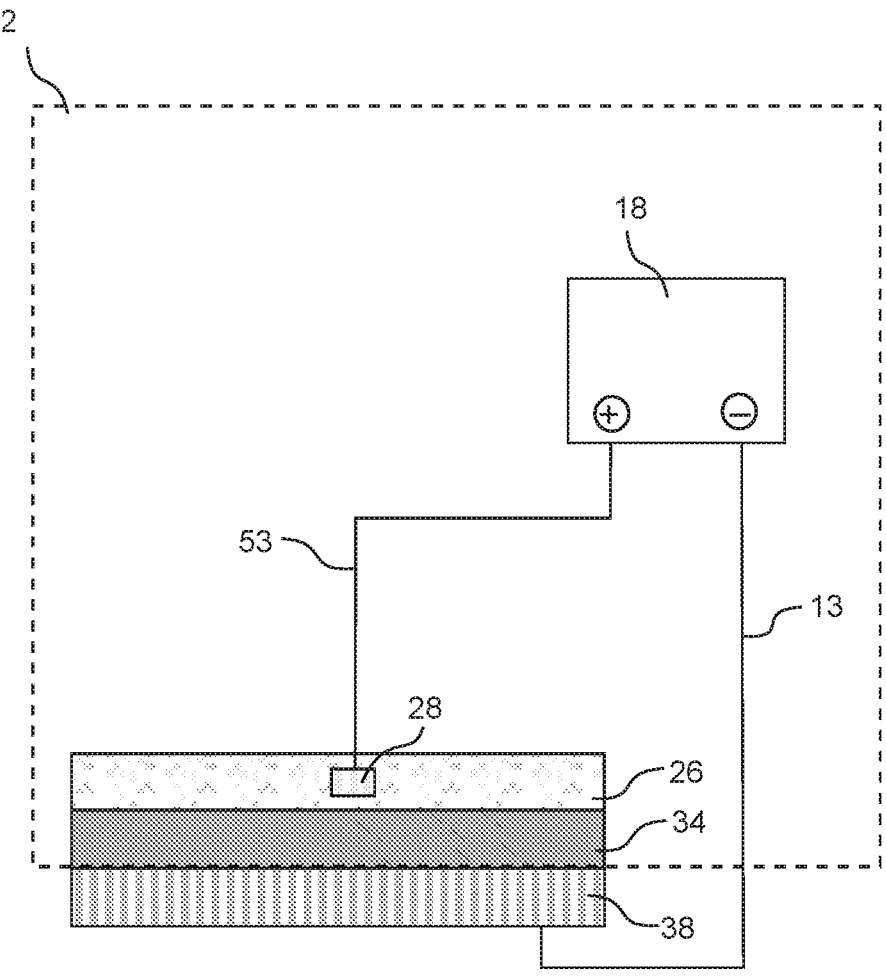
FIG. 1 is a schematic of a system for detecting and locating defects to a coating on a metallic object.

FIG. 1 is a schematic of a system 2 for real-time detecting and locating coating barrier failure on metallic objects, that exposes substrate surfaces to imminent degradation from corrosion. The system 2 is an example of the present system and different variations and combinations are contemplated. The system 2 predicts which areas of a metallic object 38 will be prone to corrosion in the future by detecting when covering anode layer 26 and electrically insulating layer 34 applied over the metallic object 38 have a defect. In the system 2, the metallic object 38 acts as a cathode, receiving current from an electron source 18 via a wire 13. The electron source 18 may apple any suitable voltage or current to the metallic object 38. The corresponding anode in the system is a covering anode 26 which is applied over a surface of the electrically insulating layer 34. However, the cathode (the metallic object 38) is not electrically connected to the covering anode 26. The electrically insulating layer 34 separates the cathode (the metallic object 38) from the covering anode 26 such that the electrochemical circuit is incomplete until a defect occurs in both the covering anode 26 and the electrically insulating layer 34 and the electrolyte such as water, seawater, moist etc. reaches to the exposed area of the metallic object 38.

When a defect such as a crack or any kind of deterioration occurs in both the covering anode 26 and the electrically insulating layer 34, water, seawater, moisture, etc. may contact the metallic object 38. Water provides an electrolyte to complete the electrochemical cell between the metallic object 38 and the covering anode 26. Current from the electron source 18 may flow through the circuit consisting of wire 53, conductive strip 28, covering anode 26, metallic object 38, and wire 13. If the electron source 18 detects current in the covering anode 26, it may determine that there is a defect in the electrically isolating layer 34 and the covering anode 26. The electron source 18 may detect current through at least one electrically conductive strip 28 that is electrically connected to the covering anode 26. The electrically conductive strip 28 may be connected to the electron source via a wire 53.

Figure 2:
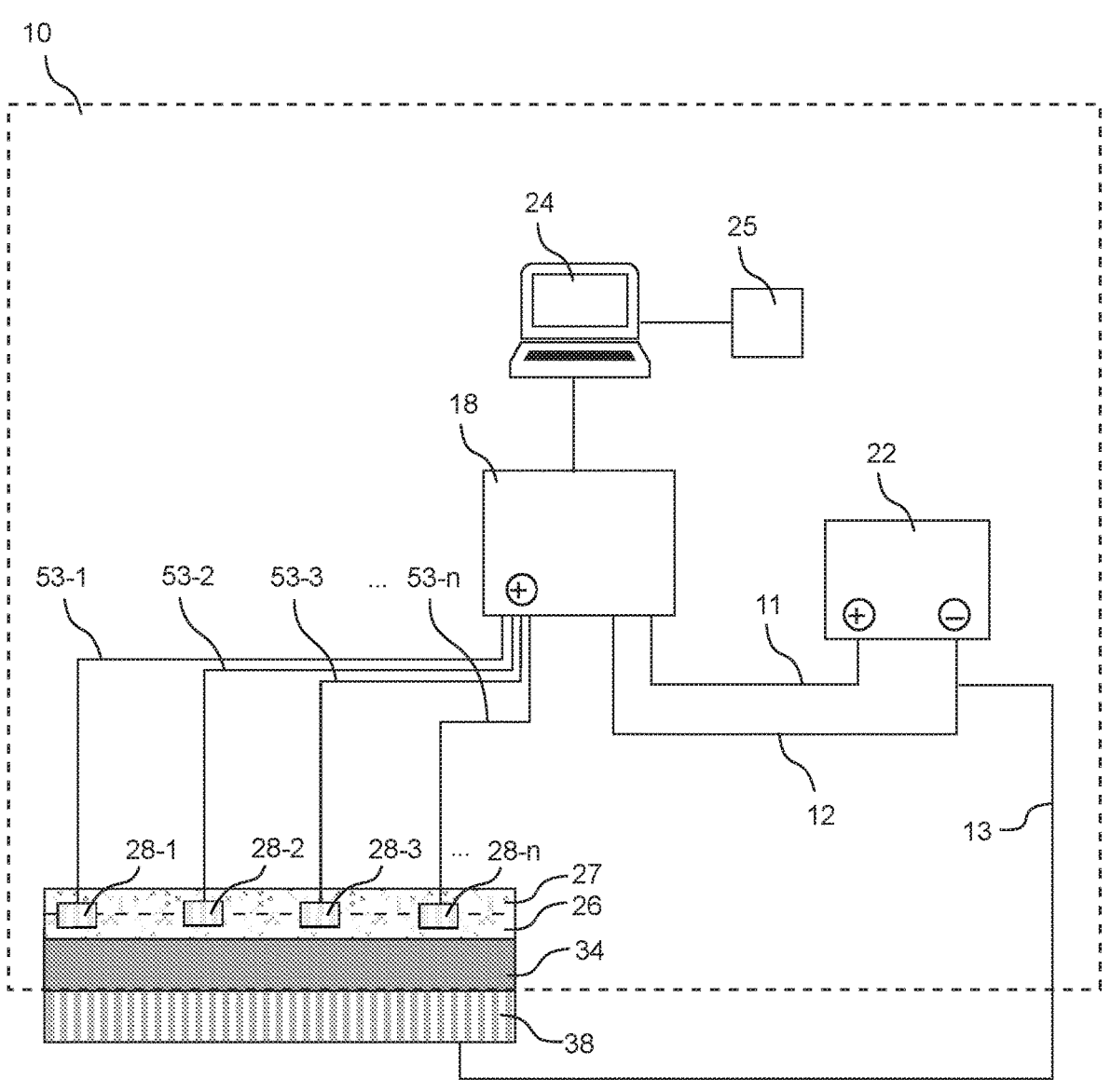
FIG. 2 is a schematic diagram of another system for detecting and locating defects to a coating on a metallic object.

FIGS. 2 to 10 show a system 10 for real-time detecting and locating damage to a coating on a metallic object 38. In this example, the metallic object 38 to be protected is a pipe that is covered by one or more layers of electrically insulating coating 34, such as any suitable kind of polymer, paint, primer or other insulating coating. Referring to FIG. 2, one or more layers of covering anode 26, 27 are applied over such substrate and the electrically insulating coating 34. In this example, the system 10 is applied to protect parts of a pipeline. However, the system 10 can be used for detecting and locating damage to a coating on any other metallic objects (mainly contemplated to be steel objects) such as the entire bodies of automobiles, vehicles, marine vessels, offshore or onshore constructions, and similar.

The system 10 includes at least one electrically conductive strip 28-1, 28-2, 28-3 . . . 28-n (generically referred to herein as "electrical conductive strip 28" and collectively as "electrically conductive strip 28"), an electron source 18 or other electrical current provider, a power source 22, and a covering anode 26, 27. The electron source 18 may be configured to provide any suitable voltage or current. The system 10 can be provided as a complete system, such as during manufacture or assembly of the metallic object, such as on-site piping system installation or an after-market kit that is applied by the end user or an agent of the manufacturer or assembler.

The covering anode 26, 27 is disposed over at least a portion of an electrically insulating coating 34 that is disposed on a metallic object 38. The metallic object 38 is any metallic (mainly steel) object or object subject to corrosion, such as a metal pipe or a marine vessel hull, for example. The electrically insulating coating 34 can include one or more coats of paint, primer, polymer coating, anodizing, or chemical conversion coatings such as chromate or phosphate conversion coatings especially for non-ferrous alloys, or similar applied to the metallic object 38.

The at least one electrically conductive strip 28 may include any number of electrically conductive strips, depending on the size and/or shape of the metallic object 38. Each electrically conductive strip 28 is in electrical contact with the covering anode 26, 27 and is electrically connected to the electron source 18 via a corresponding wire 53-1, 53-2, 53-3 . . . 53-n (generically referred to herein as "wire 53" and collectively as "wires 53"). The term "channel" will be used herein to describe a wire 53 and its corresponding strip 28. The electrically conductive strip 28 may comprise any suitable material for conducting electricity, for example, copper, aluminum, carbon fiber fabric, or such alike. In one example, the electrically conductive strip 28 comprises carbon fiber fabric Hexcel ACGP124-P-50" ZB. Carbon fiber fabric is advantageous over metals because it resists corrosion in aqueous environments. In contrast, a metal wire might corrode by becoming a sacrificial anode to the covering anode-which can become a localized cathode- and the metallic substrate, which would interrupt the signal. In general nonmetallic electrically conductive materials are good choices for this purpose.

The power source 22 in vehicle applications can be a car's 12-volt battery or similar. In other examples, the power source can be any kind of battery, municipal power supply (e.g., a wall outlet), high-voltage power source, any type of electric generator, a solar power source, or any other kind of power source. In case of the AC power supplies, some AC to DC converters may be needed.

Input wires 11 and 12 electrically connect the positive and negative poles of the power source 22 to the electron source 18. In this example, because the metallic object 38, which is the cathode being protected, is a part of or an entire automobile body that is intended to be connected to the negative pole of its battery (i.e., DC power source 22) by wire 13, there is no need to provide a separate negative connection through electron source 18 to the object 38.

The electron source 18 provides and monitors the flow of electrons (current) between the metallic object 38 to be protected, as cathode, and the covering anode 26, 27. Applying current may include applying a suitable voltage to the circuit. The electron source 18, in this example, includes a DC voltage reducer that converts an approximate nominal voltage of 12 volts (V) and an approximate current of 60 amperes to about 3 volts and about 300 milliamperes (mA). In other examples, the electron source 18 can be any kind of DC transformer, reducing DC transformer, an AC reducer and rectifier, a device capable of reducing the voltage of a battery (such as a car battery) to a lower voltage, or any other similar device.

The covering anode 26, 27 is shown as having a first layer 26 and second layer 27, however the covering anode 26, 27 is not particularly restricted. The covering anode 26, 27 may include a single layer or multiple layers of electrically conductive polymer, coating, sheet, or any kind of fabric containing carbon fibers. Electrically conductive strips 28 mainly made of carbon fiber fabric, for example Hexcel ACGP124-P-50" ZB, are embedded in the covering anode 26, 27. Electrically conductive strips 28 may be made of carbon fiber fabric. The other highly conductive nonmetallic material or metallic material such as mixed metal oxide (MMO) wire anodes, or electrically conductive wires, strips, media which is corrosion resistant in galvanic couples or such alike (including but not limited to) for benign electrolytic environments can be used.

For bonding the electrically conductive strips 28 to the covering anode, a first layer of the covering anode 26 is applied over the electrically insulating coating 34. According to the curing time of the coating material used, when it is partly dried and is still sticky/tacky (in this example, after about 2 minutes) the electrically conductive strips 28 are laid over and gently pushed into the first layer to become fixed and secured at the appropriate (or designated) locations. Then, the second layer of covering anode 27 is applied over the first layer 26 and over the strips 28 to embed them into the covering anode layers.

The composition of the covering anode in this example which is comprehensively discussed in the U.S. patent application Ser. No. 15/736,222 may be a mixture of epoxy resin from System Three (S-1 Epoxy Sealer), with 14% by weight 2-10 µm graphite powder and 1% by weight fluffy carbon black powder from Cabot VULCAN XC 72R. Other compositions for the covering anode described in the patent application Ser. No. 15/736,222, and Ser. No. 16/609,590, and Pub #2020/0216966 A1 or any other suitable composition may be used for the covering anode 26 and 27.

In various implementations of the present system and method, the covering anode 26, 27 may be a polymer, resin or glue, which may contain an amount of conductive materials, mixtures, and powders, such as graphite, activated carbon, graphene, carbon nanotubes, or any other mixtures of the conductive materials. The covering anode 26, 27 may be used as outer layer of the coating or middle layer for a "sandwich type" of application, depending on the industry or corrosive environment. In a "sandwich type" application, the topcoat over the covering anode 26, 27 includes one or more layers of coatings such as paints, topcoat paints, top clear coats, insulation, etc.

It is to be appreciated by a person of skill in the art that the released hydrogen due to cathodic protection mechanism can damage the coating or cause hydrogen embrittlement to the metallic object 38. The generation of hydrogen can be addressed by adding hydrogen absorbent materials, in the covering anode 26, 27, to prevent blistering on the coating. Furthermore, hydrogen absorbent materials may also be added into the electrically insulating coating 34 below the covering anode 26, 27 or any other layer in the total coating, combined or separated. An example of hydrogen absorbent material can be a mixture of 0.5% wt silver oxide 2-10 μm powder with 4.5% wt manganese dioxide 2-10 μm powder in the binding resin. It is to be appreciated that the exact hydrogen absorbent material is not particularly limited and that any kind or amount of hydrogen absorbent mixtures and materials can be used in any kind of resin or glue, or separate from the resin or glue. The coating may be selected to possess the adhesion characteristics and porosity that are standard requirements for common paints.

It is contemplated that when selecting a type or combination of materials for a covering anode 26, 27 according to the present system and method, the surface electrical resistivity of the layers of the covering anode 26, 27 should be measured and used for calculation of voltage and current and for configuration of the specific electron source 18 used for cathodic protection, as well as for calculating and designing the layout and numbers of electrically conductive strips 28. Another consideration is that, before applying the covering anode 26, 27 over the electrically insulating coating 34, and the insulating coating over the metallic surface the cleaning process and surface preparation should be implemented according to the manufacturer's instructions.

In order to monitor the system 10 for defects to covering anode 26, 27 and electrically insulating coating 34 over the metallic substrate 38, the electrically conductive strips 28 are connected to the electron source 18 with wires 53. When current is detected in at least one of the wires 53, the electron source 18 determines that a defect is present.

FIGS. 5-10 and 16-19 show an example of how the electrically conductive strips 28 can be connected with an electrical connector 32 to the wire 53. The electrically conductive strips 28 in these examples may comprise a strip of carbon fiber fabric. The electrical connector 32 in this example may be any standard non-metallic electrical connector. The electrical connector 32 can be of any type or shape and material to make a suitable electrical connection of one end of the carbon fiber fabric 28 to the suitable wiring 53 of the circuit. The electrically conductive strip 28 in one example comprises Hexcel ACGP124-P-50" ZB carbon fiber fabric, but the electrically conductive strip 28 is not particularly limited and can be made of any suitable type of carbon fiber fabric of any shape and size. The electrically conductive strip 28 can also be of any kind of flexible non-metallic electrically conductive material or mixture.

Embodiments where the electrically conductive strip 28 is flexible and non-metallic have some notable advantages over metallic strips. Metallic strips may be subject to galvanic corrosion in direct contact with the corrosive environment and electrolyte, even if covered with some kind of electrically insulating coating. Therefore, the galvanic corrosion of the metallic strip will eventually cause the electrochemical cell to be cut off and stop reporting the damage to the electron source 18. In embodiments where the electrically conductive strip is non-metallic, there will be no galvanic corrosion on the circuit elements, and therefore, this method can be easily applicable on any complicated substrate design and in harsh, corrosive environments.

When using the electrically conductive strip 28 and such alike, the capillary characteristic of the fabric may draw the liquid electrolyte from the anode surface to the electrical connector 32, causing corrosion to the metallic core 54 of the wire 53. This may cause the electrical circuit to be cut off. A technique to reduce the capillary action is comprehensively illustrated in the U.S. patent application Ser. No. 16/609,590, and US Publication No. 2020/0216966 A1. An end of the electrically conductive strip 28, which is connected to the electrical connector 32 may be coated with a resin or non-conductive paint such as polyurethane, epoxy, or the like. The end of the electrically conductive strip 28 may then be folded over, twisted, or rolled up on itself while the resin is still wet, and the strip 28 may dry in folded shape. The folding, twisting, or rolling step may close some of the orifices and passages in the fabric or may render the orifices and passages smaller. Any remaining orifices or passages may be clogged up by the resin when it dries. Finally, the part of the flexible electrode containing the connector 32 and attached electrical wire 53 may be thoroughly covered with an electrically insulating coating such as epoxy resin or glue or any other kind of electrically insulating resin, paint or glue coating. It is to be appreciated that addressing the capillary action on the strip 28 is not limited to this example and other techniques are contemplated. In the embodiments shown in FIGS. 6, 8-10, and 16-18, the folded end of strip 28 is connected to one end of a graphite rod 41 inside the connector 32, and the other end of the graphite rod is connected to the metallic core 54 of the wire 53. Graphite is highly conductive and therefore can conduct electrical current between the strip 28 and the wire 53. However, because the graphite member has no orifices or passages and therefore cannot absorb the electrolyte via capillary action, graphite may also act as a barrier, preventing an electrolyte such as water from travelling through the connector 32 to the wire 53 via capillary action.

Figure 8:
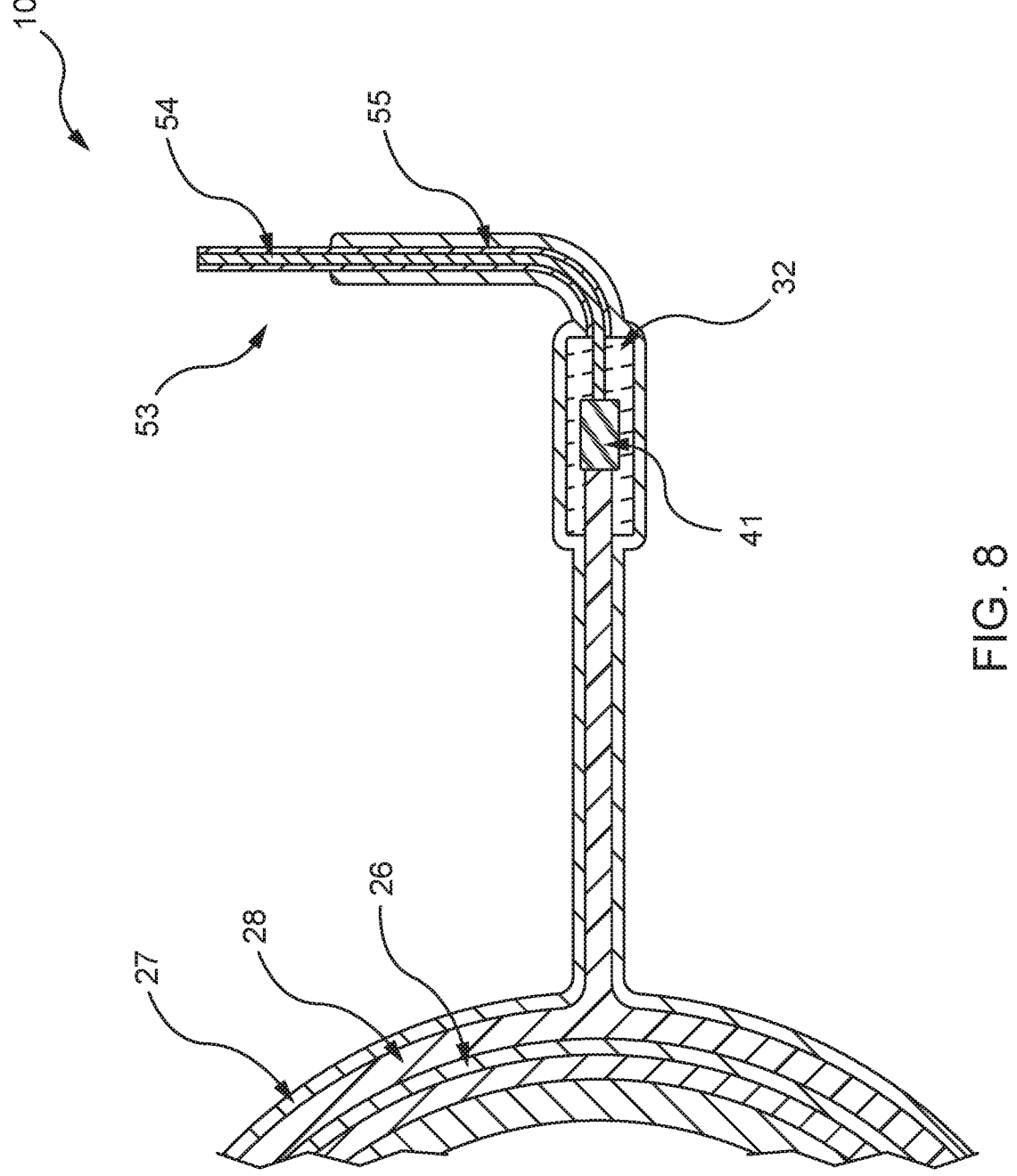
FIG. 8 is a cross-section of the system of FIG. 2 at F-F.
Figure 9:
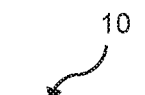
FIG. 9 is a cross-section of the system of FIG. 2 at E-E.
Figure 9:
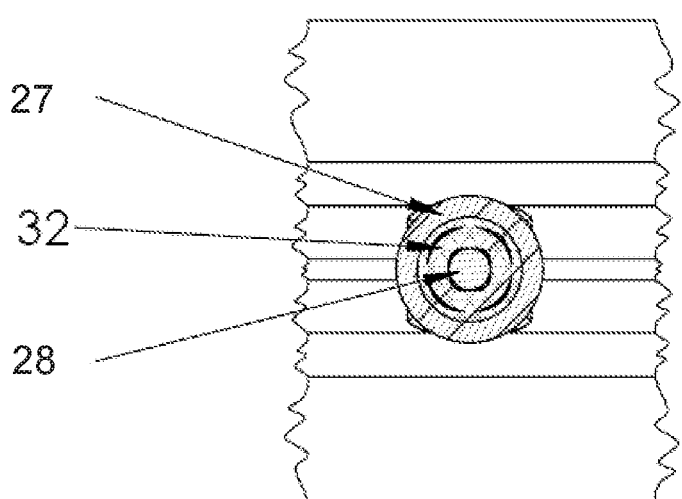
Figure 10:
FIG. 10 is a partial cross-section of the system of FIG. 2 at D.
Figure 10:
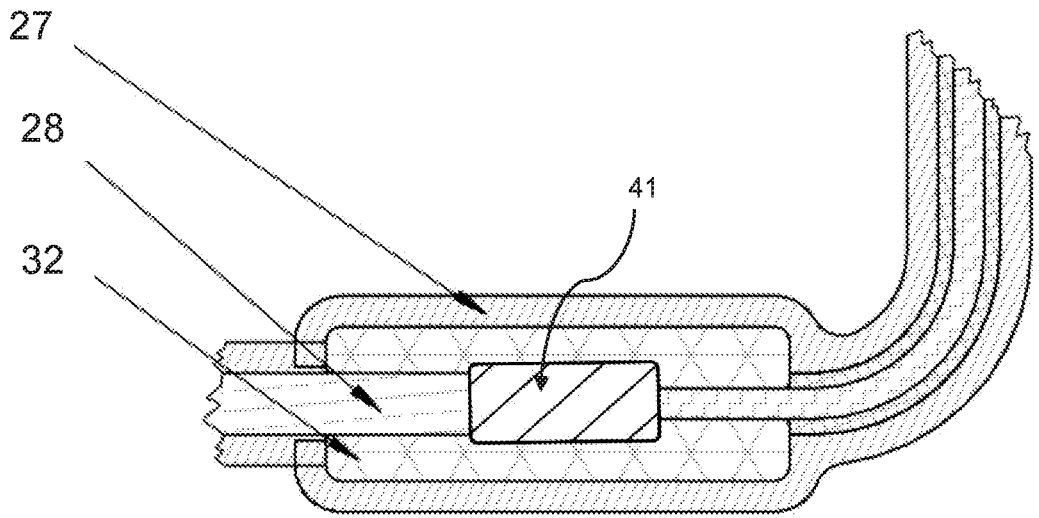

To install the sensors into the covering anode 26, 27, the first layer of covering anode 26 may be applied by brush or spray gun over the electrically insulating coating 34. When the first layer of the covering anode 26 is partly dried but is still sticky or tacky, the sensor may be gently pushed onto the first layer of covering anode 26 to become fixed and secured at its appropriate location. Then, the second layer of the covering anode 27 may be applied over the first layer 26 and over the sensor to embed the sensors in the covering anode 26, 27. In the example shown in FIG. 6-10, an end of the sensor protrudes from the covering anode 26, 27. This end is attached to a wire 53 using an electrical connector 32. As shown in FIGS. 8-10 the covering anode 26, 27 may be applied over the protruding end of the electrically conductive strip 28, the electrical connector 32, and at least a portion of the wire 53 so as to facilitate a good electrical connection.

Figure 6:
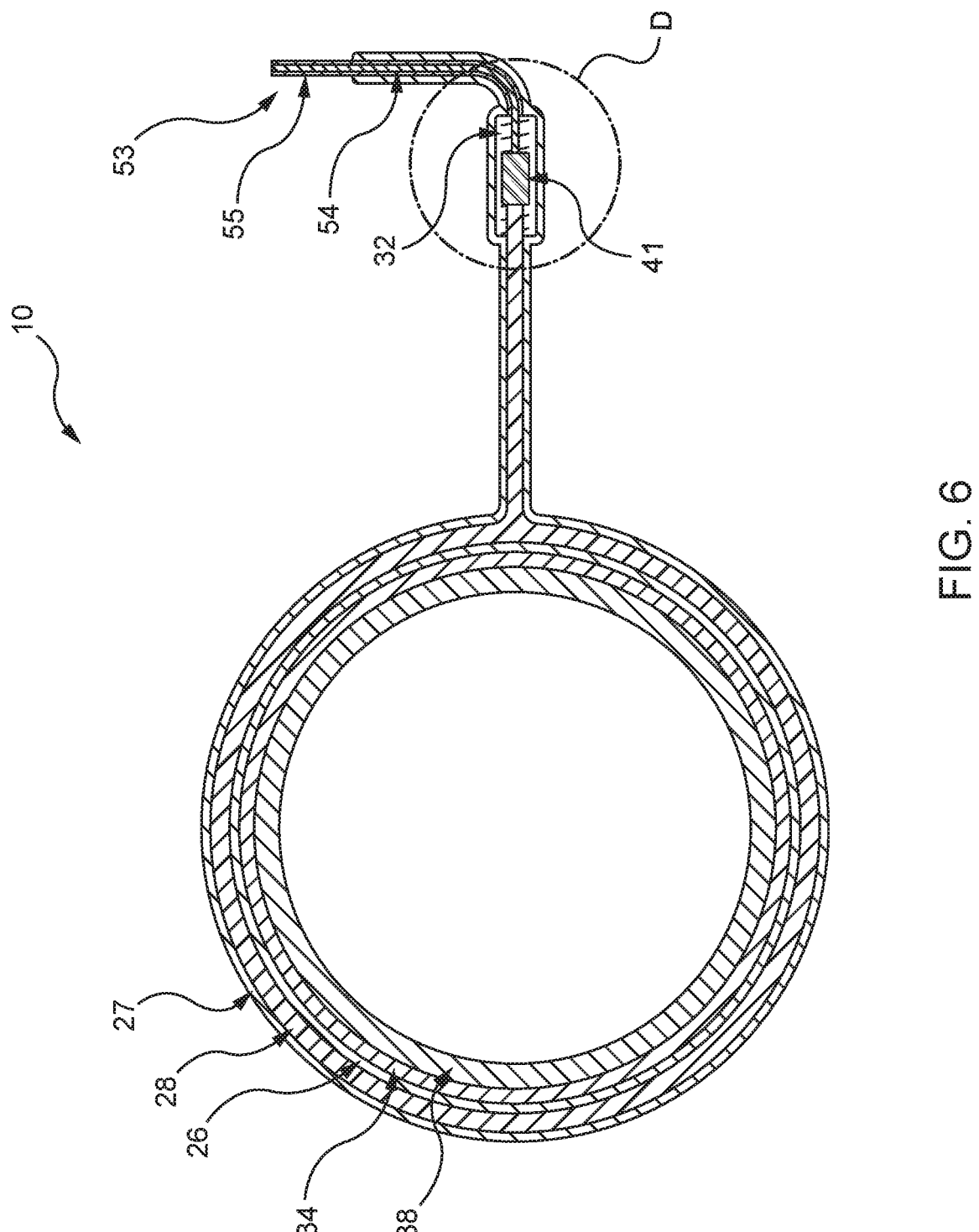
FIG. 6 is a cross-section of the system of FIG. 2 at A-A.
Figure 7:
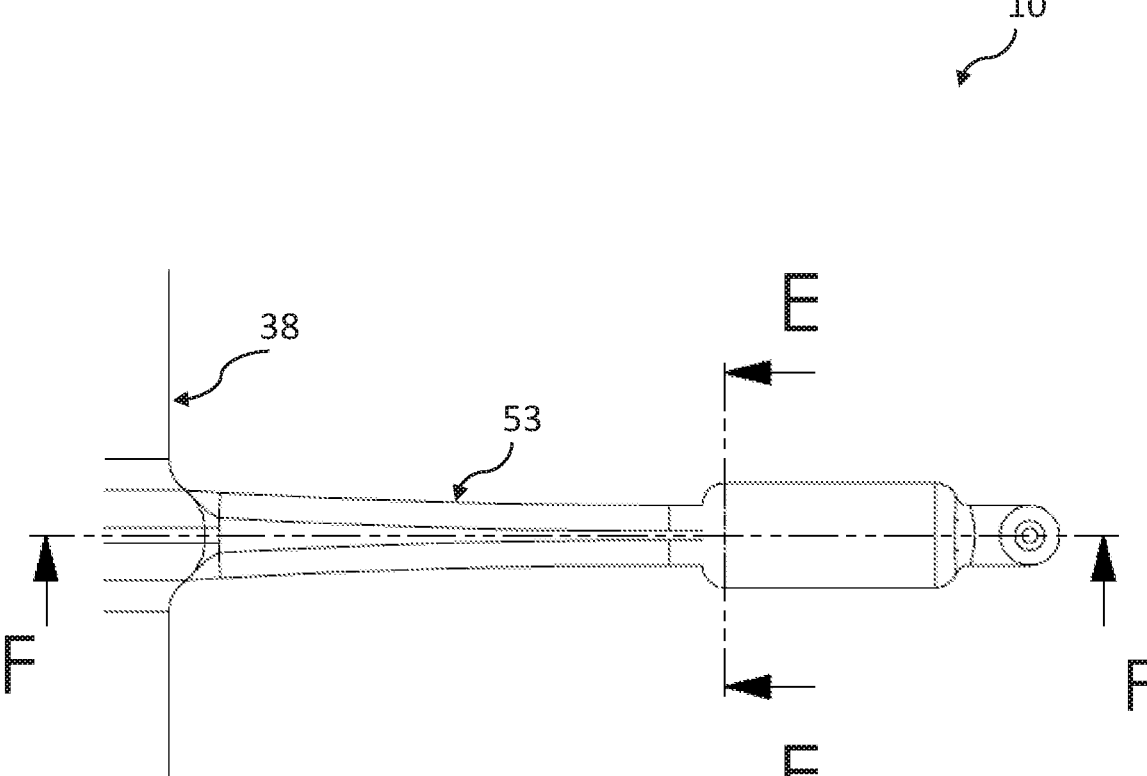
FIG. 7 is a partial top view of the system of FIG. 2 at B.

Prior to applying the covering anode 26, 27, the surface of the electrically insulating coating 34, may be prepared according to the coating manufacturer's instructions. The covering anode 26, 27 may be well mixed to achieve a homogeneous mixture of resin or the polymer matrix and filler. The first layer of covering anode 26 may be applied by brush or spray gun over the electrically insulating coating 34 with the desired thickness recommended for that specific industry to which the system is being applied. When the first layer of the covering anode 26 is partly dried but is still sticky or tacky, the electrically conductive strip 28 may be gently pushed onto the first layer of covering anode 26 to become fixed and secured at its appropriate location. Before applying the electrically conductive strip 28, the strip 28 may be cleaned or degreased, or both. Then, the second layer of the covering anode 27 is applied over the first layer of the covering anode 26 and over the electrically conductive strips 28 to embed the electrically conductive strips 28 in the covering anode 26, 27, as shown in FIG. 2, with the exception of one end of the electrically conductive strips 28, as shown in FIGS. 6 and 8. The second layer of covering anode 27 may be the outer layer. A separate topcoat may be applied over the covering anode 26, 27. Electrically conductive strips 28 can be secured on or in the covering anode 26, 27 by any other method to electrically connect the covering anode 26, 27 to the electron source 18. After the covering anode 26, 27 is cured, electrically conductive strips 28 may be connected to the corresponding wires 53, which are connected to the electron source 18, as shown in FIG. 2. This process may be repeated for any number of surfaces/sides of the object 38 to be protected.

The mechanism of operation is described with reference to FIG. 2. A metallic object 38, i.e., steel substrate, is protected on one side. In this example, the covering anode 26, 27 is applied on a surface of a pipe such as a pipe of a chemical processing plant. When a part of the combination of the covering anode 26, 27 and electrically insulating coating 34 gets damaged (e.g., cracked) or becomes missing, the bare surface of the metallic object 38 becomes exposed. At the moment when an electrolyte (which can be any type of oxidizing or corrosive medium, such as water condensate, mist, or seawater) penetrates through the crack or aperture in the covering anode 26, 27, the electrolyte touches the surface of the metallic object 38 and the covering anode 26, 27 at the same time. This activates the cathodic protection to prevent corrosion. Additionally, a signal is transmitted indicating that damage has occurred to the covering anode 26, 27 and the electrically insulating coating 34.

As shown in FIG. 2, the metallic object 38 and covering anode 26, 27 are separated by one or more layers of electrically insulating coating 34 and are connected to the electron source 18 that provides a current of electrons. Hence, in a corrosive environment when an electrolyte is created and comes into contact with the surfaces of the covering anode 26, 27 and cathode 38 due to a damage on the coating and exposed surface of the cathode 38, an electrochemical cell will be created in which, at this moment, the potential difference between the covering anode 26, 27 and cathode 38 will concentrate the oxidation process on the anode of the cell and suppress the corrosion process at the cathode. At this moment, the electric circuit is complete and current can now flow from the electron source 18 via the wires 53 to the metallic object 38, through the electrolyte to the covering anode 26, 27, and return to the electron source 18 via the electrically conductive strip 28. It is this current that is detected as an electric signal indicative of a defect to the electrically insulating coating 34 and the covering anode 26, 27.

Not only can this system 10 be configured to detect damage to the covering anode 26, 27 and electrically insulating coating 34, it can also locate the damage. Damage to the covering anode 26, 27 and electrically insulating coating 34 may be located relative to the electrically conductive strips 28 which carry the current drawn from the electron source 18. It is contemplated that the electrically conductive strips 28 are distributed over the surface of the metallic object 38. When damage occurs to the covering anode 26, 27 and insulating layer 34, exposing the cathode 38 to the electrolyte, an electrical signal is conducted by the covering anode 26, 27 to the electrically conductive strips 28. However, due to the electrical resistance of the covering anode 26, 27, the current of the electrical signal dissipates with distance from the location of the damage. Therefore, the electrically conductive strip(s) 28 closest to the location of the damage will transmit a current flow with the highest amount to the corresponding wire 53. For example, if the covering anode 26, 27 and electrically insulating coating 34 are damaged at a point between electrically conductive strips 28-2 and 28-3, the electron source 18 may receive an electrical signal from 28-1 with a relatively low current, but the electrical signal received from both 28-2 and 28-3 would have a relatively higher current. Based on the relative current measured in each of the electrically conductive strips 28, the electron source 18 can determine the location of the defect to the coating.

As shown in FIG. 2, the electron source 18 may include or be connected to a power supply 22. The power supply 22 may comprise a suitable source of power including, but not limited to, a DC battery, an AC wall power source or charger, a battery charger, or a solar cell.

The electron source 18 may include or be connected to a processor 24. The processor 24 may be configured to provide and measure electric current between the metallic object 38 and the covering anode 26, 27 and further to output location information based on electron flow via the indicator 25. In addition, the processor 24 may be programmable for different levels of electron flow and status information. For example, the processor 24 can store a lookup table that associates levels of measured electron flow with output signals provided to an indicator 25.

The indicator 25 may comprise an alert light, a speaker, or a display, but the indicator is not particularly limited. In some embodiments, the indicator 25 is integrated with the processor 24 into a single device. For example, the indicator 25 may comprise a display of a single computer and the processor 24 may comprise the computer processing unit of the same device. In other embodiments, the indicator 25 is separate from the processor 24. The electron source 18 is programmable to control the indicator 25 to indicate the presence or location of damage to the covering anode 26, 27 and insulating layer 34. In examples where the indicator 25 comprises an alert light, the indicator 25 may be programmed to communicate the presence of location of damage using flashes, colors, or a combination of flashes and colors. In examples where the indicator 25 comprises a display, the presence or location of damage may be communicated as a graphic, an animation, alphanumeric characters, or the like.

In order to monitor system 10 for defects and detecting and locating damage to the covering anode 26,27 and to the electrically isolating layer 34, the electrically conductive strips 28 (sensors) are connected to the electron source 18 with wires 53. While the total coating is intact, the current draw in the circuit and through the channels is zero. The processor 24 is programmed to apply a pre-set voltage to all channels, which can be changed and adjusted, and programmed. At the moment that damage (such as crack, chip, or scrape, etc.) happens to a part of the coating (34 and 26,27), the metallic substrate 38 is exposed to the electrolyte, and the Impressed Current Cathodic Protection (ICCP) is activated. The current flow commences through all channels. The electron source 18 is programmed to periodically (for example here, every 120 minutes) cut the power from all channels except one and measure and record the transmitted current from that channel, then repeat the process for another channel until it is done for all channels one by one in that period. In this way, all channels may be scanned in a very short time. For example, it may take only one tenth of a second to scan each channel. The period of time in which the channels are scanned will herein be referred to as the scanning period. The scanning period may be repeated periodically. In some examples, the scanning period may be repeated every 120 minutes. It should be understood that the circuit is closed and complete at all time, even during the scanning period, each of the channels is individually connected one at a time. After each scanning period, the processor 24 indicates the wires 53 corresponding to the strips 53 that are closest to the damaged area, which are the wires 53 with the highest amount of the transmitted current. In this example, the processor 24 is programmed to indicate the four wires 53 with the highest current amount. By this method, the location of the damaged area is being indicated by its proximity to strips 53 corresponding to the wires 53 with the highest current.

Figure 3:
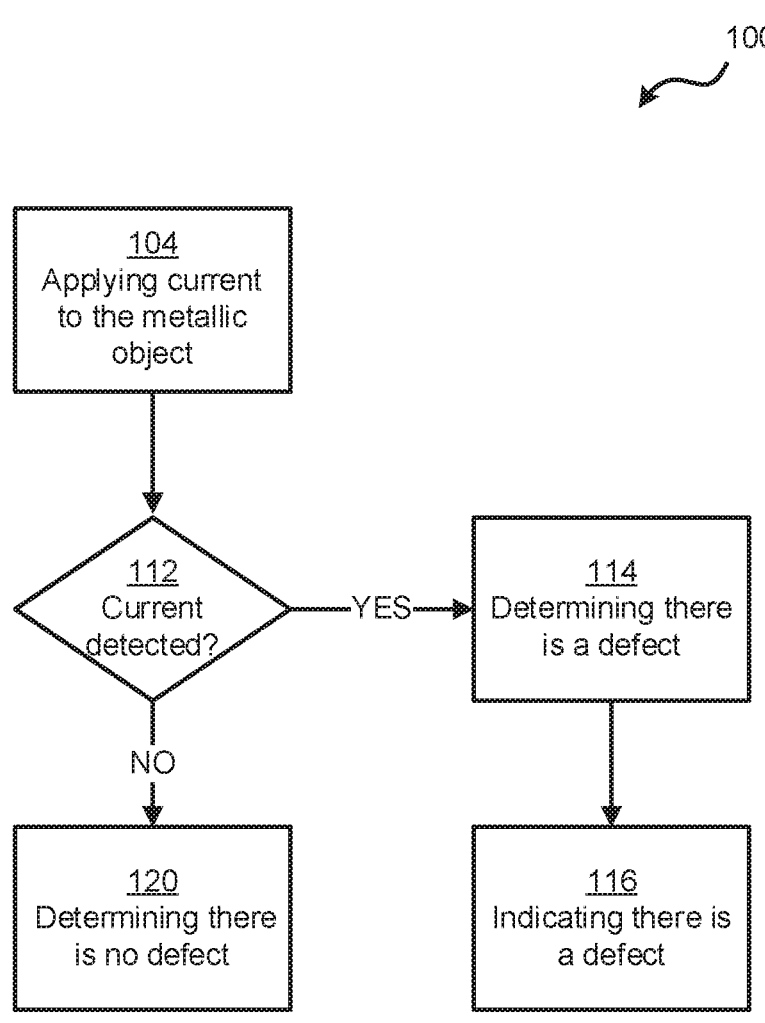
FIG. 3 is a flowchart of a method for detecting a defect to a coating on a metallic object.

FIG. 3 shows a method 100 for detecting one or more defects in the covering anode 26, 27 and the insulating layer 34 of system 10. At block 104, the electron source 18 applies current to the metallic object 38 which is coated with an insulating layer 34. The insulating layer 34 is further coated with a covering anode 26, 27 for conducting current. At block 112, the electron source 18 determines whether current is detected in the at least one electrically conductive strip 28 that is connected to the covering anode 26, 27. If the insulating layer 34 and covering anode 26, 27, have no defects it will effectively prevent current from being transmitted between the metallic object 38 and covering anode 26, 27, and consequently the electron source 18 will not detect current. In this circumstance, the processor 24 connected the electron source 18 will determine at block 120 that there are no defects in the insulating layer 34 and covering anode 26, 27. If however, the electron source 18 detects current in one or more of the at least one electrically conductive strips 28, this indicates that there is at least one defect in the insulating layer 34 and covering anode 26, 27. The defect has allowed an electrolyte to pass through the insulating layer 34 and covering anode 26, 27 and contact the metallic object 38. The electrolyte, may form an electrochemical cell between the metallic object 38 and the covering anode 26, 27. When current is detected in the electrically conductive strip 28, the processor 24 determines at block 114 that there is a defect in the insulating layer 34 and covering anode 26, 27. At block 116, the processor 24 may control the indicator 25 to indicate that there is a defect in the insulating layer 34 and covering anode 26, 27.

As part of block 112, the electron source 18 may measure the amount of current detected in the electrically conductive strip 28. When the measured current is null (i.e., no current is measured), such a measurement may allow the electron source 18 to make the determination at block 112 that no current is detected. The measurements obtained by the processor 24 through method 100 may be stored in memory at the processor 24. Periodically or continuously, the processor 24 may repeat all or parts of the method 100. For example, the processor 24 may cause the electron source 18 to apply a current to the metallic object 38 at block 104. At block 112, the processor 24 may measure a first current in the electrically conductive strip 28 and store said first current in memory at the processor 24. Then, the processor 24 may repeat blocks 104 and 112, this time, the processor may measure a second current in the electrically conductive strip 28. As part of block 114, the processor 24 may compare the first and second currents. If the second current is greater than the first current, the processor 24 may determine that the defect in the covering anode 26, 27 and insulating layer 34 is worsening over time. By also recording the time and date that the first and second currents were measured, the processor 25 may be further configured to calculate the rate at which the defect is worsening If the rate exceeds a predetermined threshold, the processor 24 may control the indicator 25 to communicate an alert. In some examples, the system 10 may be configured to only communicate an alert at the indicator 25 if the rate exceeds the pre-determined threshold.

Figure 4:
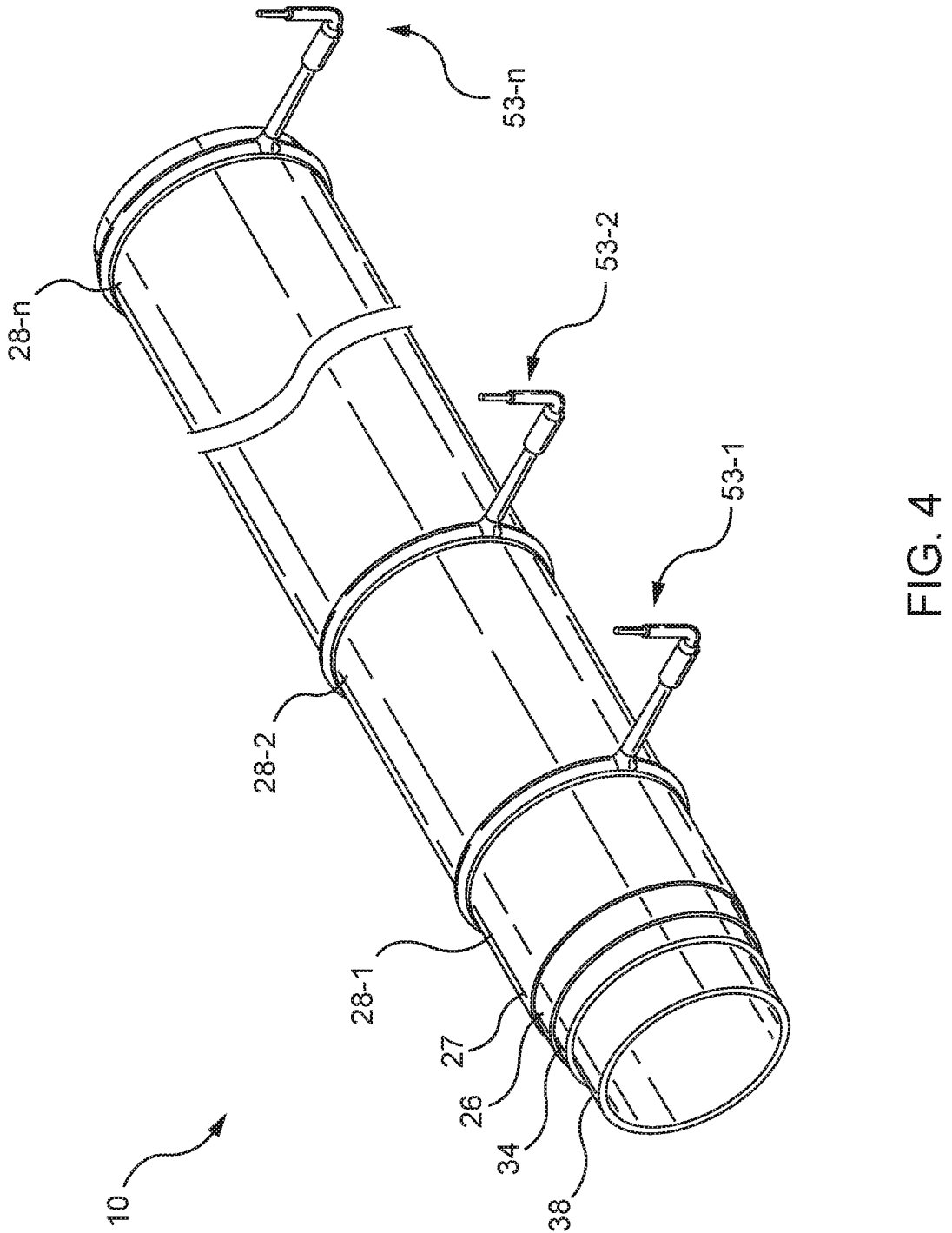
FIG. 4 is a perspective view of the system of FIG. 2.
Figure 5:
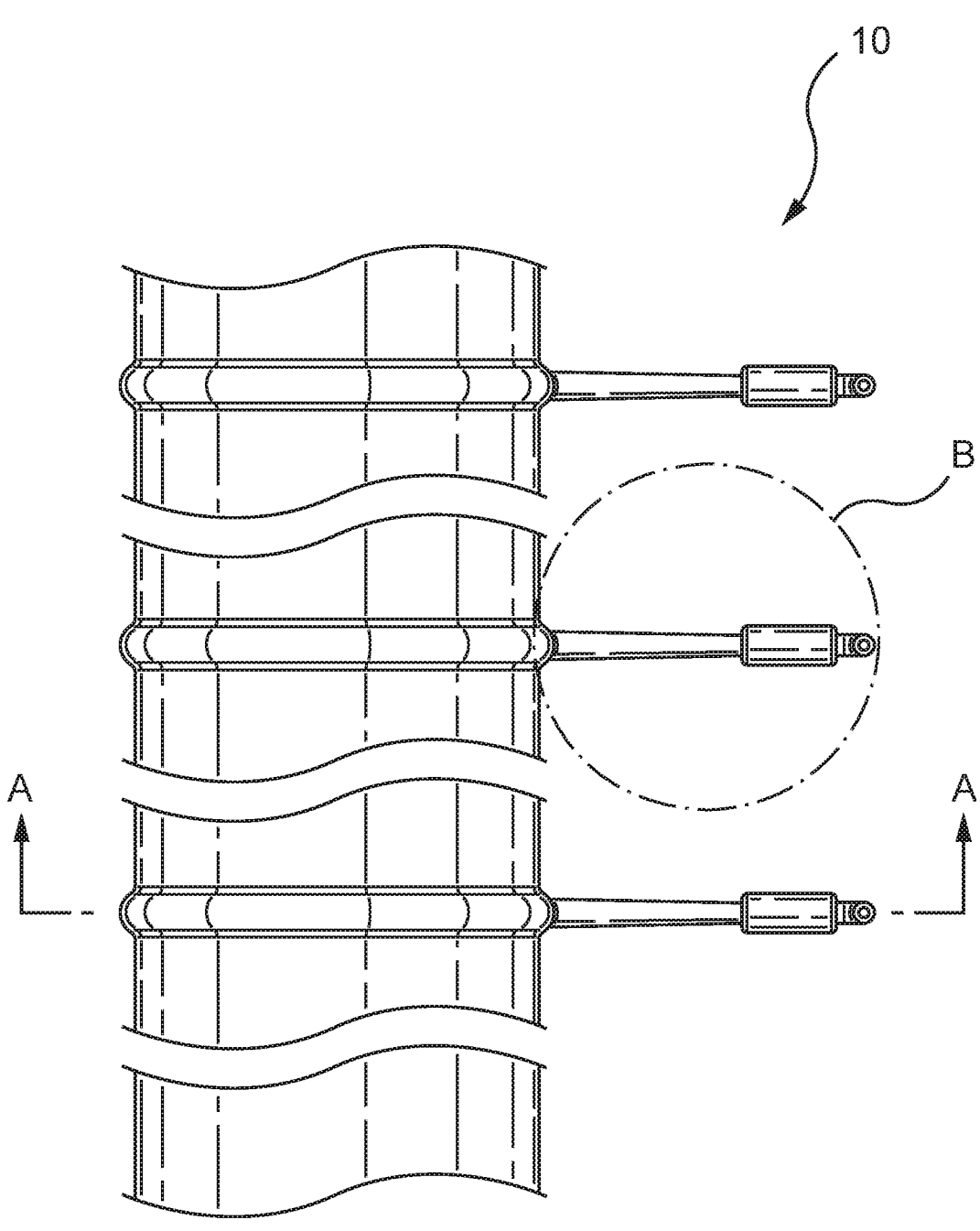
FIG. 5 is a top view of the system of FIG. 2.

FIG. 4 is a perspective view of a system 10 for detecting and locating damage to a coating on a pipe. When the metallic object 38 is a pipe, the covering anode 26, 27 and electrically insulating coating 34 may be applied to outer surfaces of the pipe. To distribute the electrically conductive strips 28 across the surface of the pipe 38 for corrosion location purposes, the electrically conductive strips 28 may be applied circumferentially, forming rings on a surface of the pipe 38. In this arrangement, the electrically conductive strips 28 divide the pipe into cylindrical segments bounded by the electrically conductive strips 28. The distance between the electrically conductive strips 28 may be chosen to improve specificity and selectivity, to ensure that the electrical signal reaches a threshold for detection, and/or to limit installation and maintenance costs.

The electron source 18 may include a processor 24 configured to monitor each of the wires 53 for current and, if current is detected in any one of the wires 53, to determine that there is a defect in the insulating layer 34 and covering anode 26, 27. The electron source 18 may, for example, comprise an LCD display to show the 4 closest strips 28 to the defect in the coating. The processor 24 may be connected to electron source 18 and for example programmed to sort all strips 28 which are connected to the wires 53 from high to low and keep the record of the currents for each channel through the time and provide the related tables of data or graphs. In this way even the progress of the damage growth can be monitored in real time.

Systems such as the one shown in FIGS. 4-10 may be further configured to locate defect(s) to the insulating layer 34 and covering anode 26, 27. In such systems, the processor 24 is configured to generate location information based on the relative current measured in each of the electrically conductive strips 28. The location information may be expressed as one of the electrically conductive strips 28-1, 28-2, 28-3 . . . 28-$n$ that is closest to the damage or as segment of the pipe bounded by two of the electrically conductive strips 28 that are nearest to the damage, or even graphically show the location of the damage as a virtual image in the form of Digital Twinning. For example, the processor 24 may select a first electrically conductive strip that has the highest current and identify the location of the defect as a region surrounding the said electrically conductive strip. In another example, the processor 24 may select a first and second electrically conductive strip as having the highest and second highest current and identify the location of the defect as a region between said electrically conductive strips.

Figure 11:
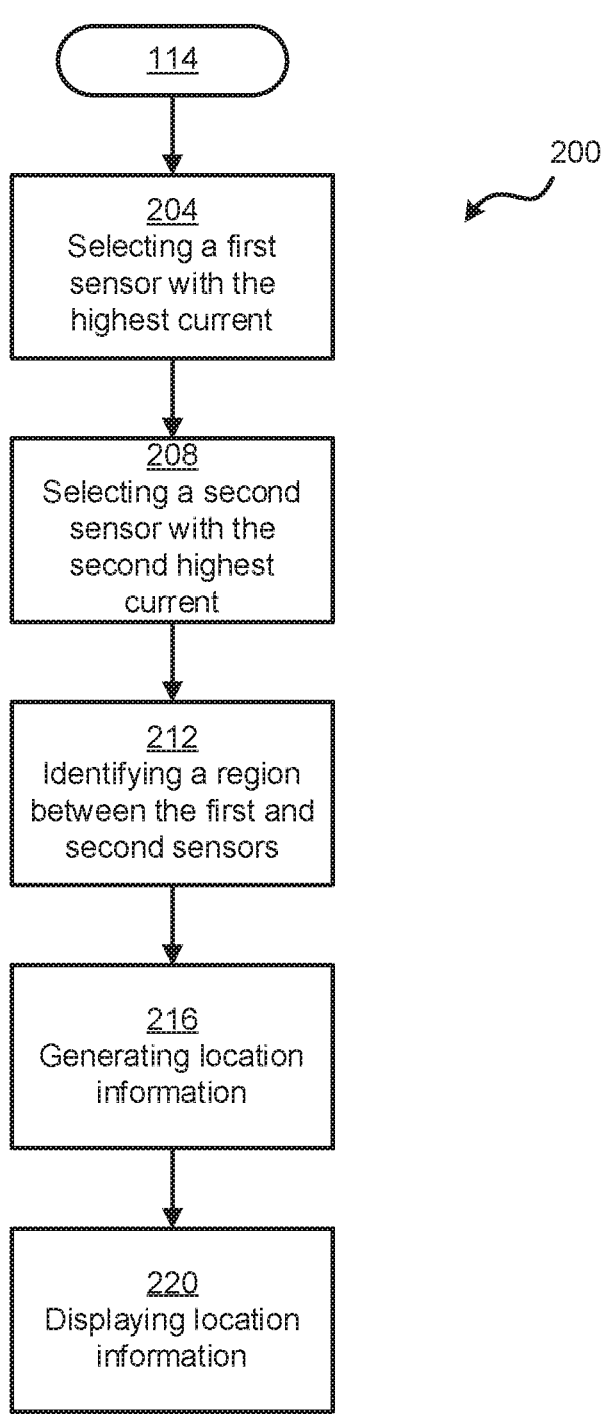
FIG. 11 is a schematic diagram of a method for locating a defect to a coating on a metallic object.

FIG. 11 shows a method 200 for locating defects to the insulating layer 34 and covering anode 26, 27 of the system 10. Method 200 can be performed after block 114 of method 100. The method 200 shown in FIG. 11 can be performed in any system 10 where the strips 28 encircle the metallic object 38. Blocks 204 to 220 are performed by the processor 24 in response to determining that there is a defect at block 114 of method 100. The locating function depicted in blocks 204 to 220 is performed based on the relative current detected at the strips 28. At block 204, the processor 24 selects a first electrically conductive strip conducting the highest current. At block 208, the processor 24 selects a second electrically conductive strip which is the strip that conducts the second highest current. At block 212, the processor 24 identifies a region between the first and second strips and determines that the location of the defect is in that region. At block 216, the processor 24 generates location information representing the location of the defect. At block 220, the processor 24 controls the indicator 25 to display the location information.

The processor 24 may further be connected to an indicator 25 for outputting the location information. For example, the location of damage could be expressed as coordinates for a particular segment of the pipe, or the location could be displayed in a diagram or 3D model of the metallic object 38 or as a live digital twinning concept. If multiple defects are present in the insulating layer 34 and covering anode 26, 27 the system 10 may be configured to locate more than one defect. Multiple defects in the covering anode 26, 27 and the insulating layer 34. may be detected if the electron source 18 detects multiple sensors with current higher than the respective adjacent sensors, or any other configuration. For example, the processor 24 may compare the current conducted by a first sensor to each of its neighbours. If the first sensor transmits more current than at least two of the sensors nearest the first sensor, the processor 24 may determine that there is a first defect. The processor 24 may further determine that the first defect is located proximal to the first sensor. The processor 24 may then compare the current conducted by a second sensor to each of its neighbours. If the second sensor transmits more current than at least two of the sensors nearest the second sensor, the processor 24 may determine that there is a second defect. The processor 24 may further determine that the second defect is located proximal to the second sensor. This process can be repeated for any number of sensors to detect any number of defects in the covering anode 26, 27 and the insulating layer 34.

The system 10 is also capable of self-monitoring. The system 10 is able to notice if one or more of the strips 28 are cut off. If in the process of locating, one or more strips 28 show no current draw while other strips 28 show the current draw, it would indicate that those strips 28 showing no current draw have been cut off from the circuit.

The electron source 18 may be configured to detect current in the wires 53 continuously, periodically, or on-demand. For instance, the electron source 18 may be programmed to detect current transmitted by the wires 53 on an hourly, daily, or weekly basis. In another example, the electron source 18 may detect current transmitted by the wires 53 only when directed by a user. Note that the electron source 18 applies current to the system 10 on a continuous basis or intermittently.

Figure 12:
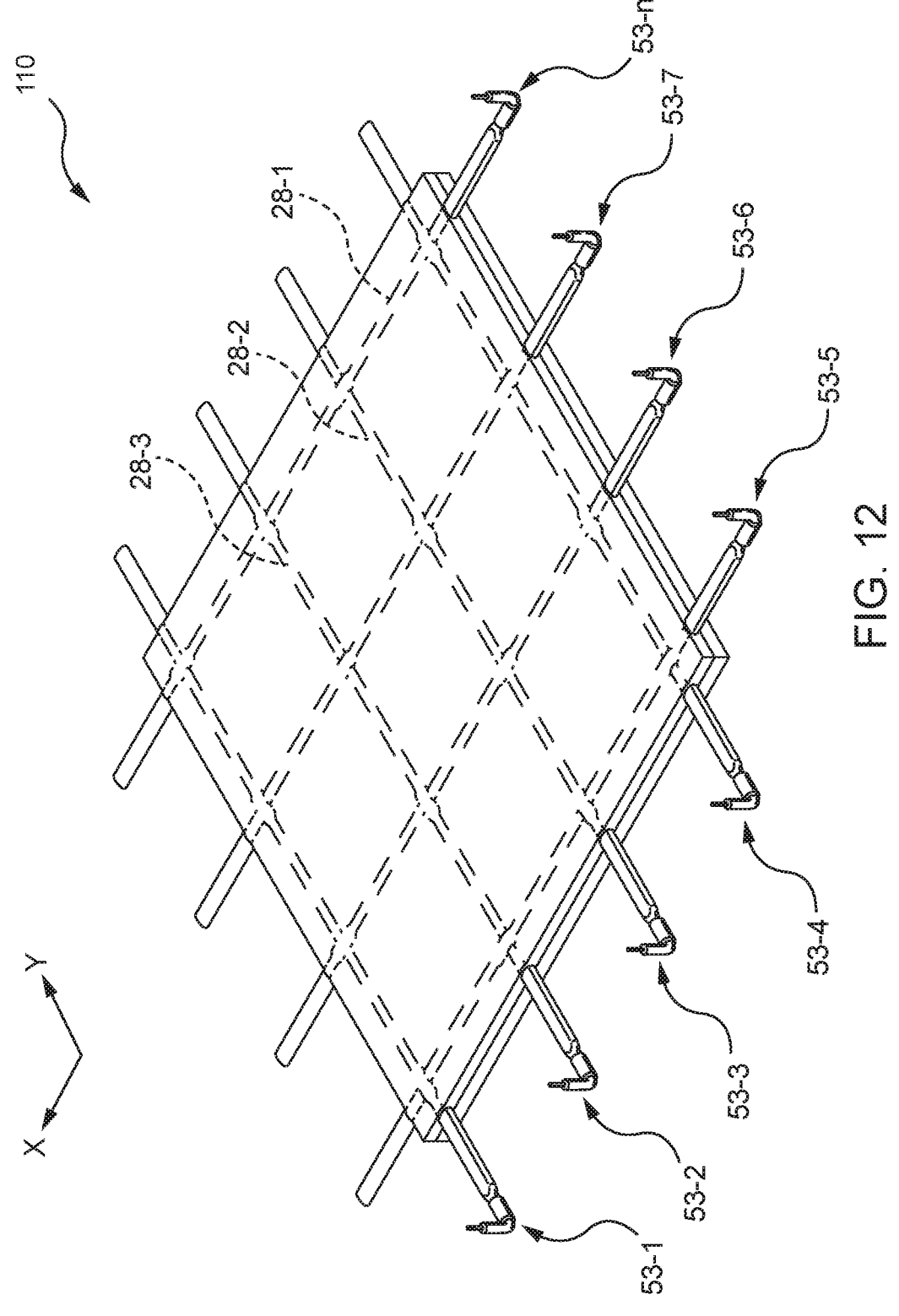
FIG. 12 is perspective view of another system for detecting a defect to a coating barrier failure on a metallic object.
Figure 13:
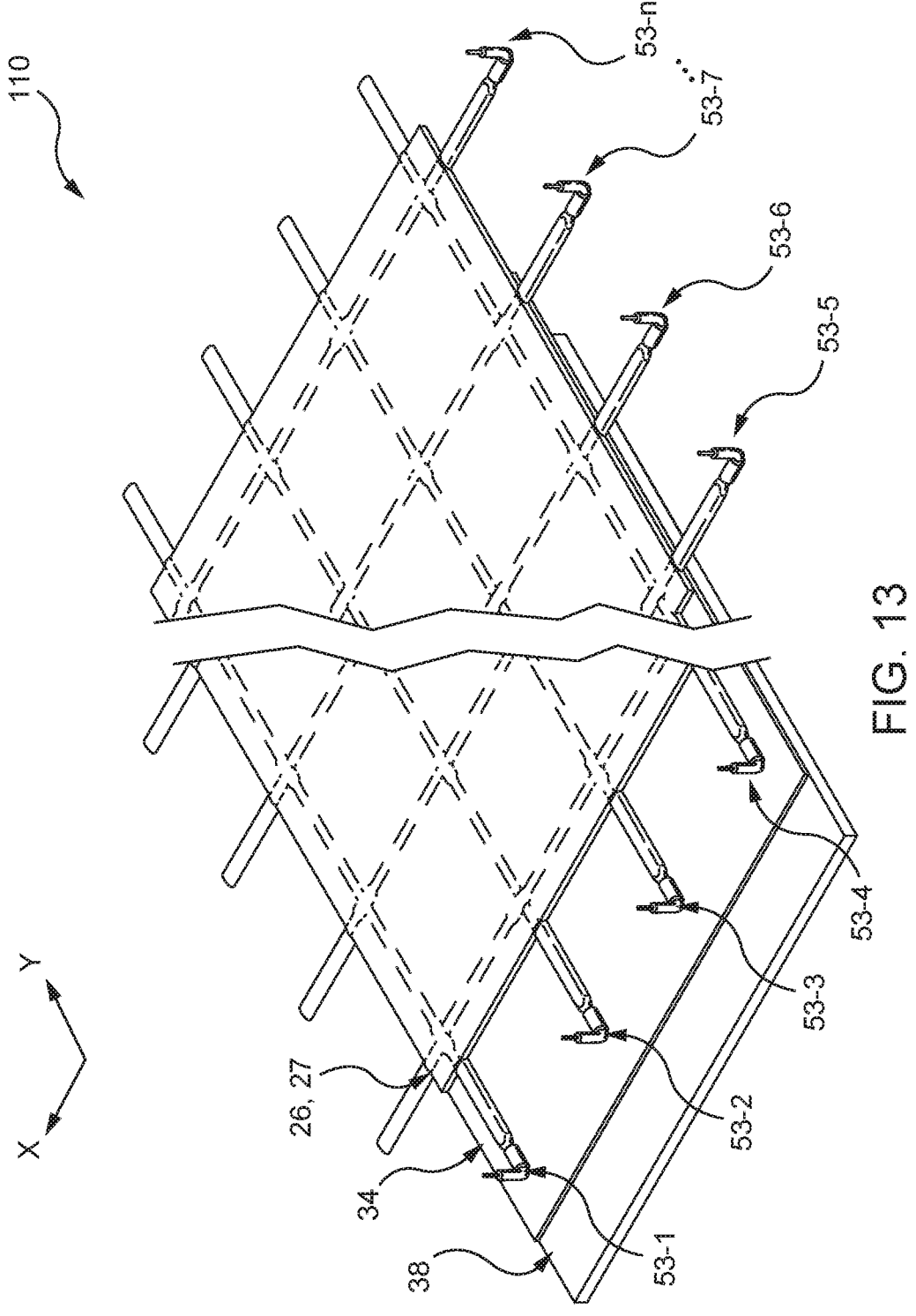
FIG. 13 is a cutaway of the system of FIG. 12.

The system and method is not necessarily restricted to pipes or pipelines. It is also contemplated that the system and method can be applied to industrial machinery, vehicles, marine vessels, and onshore and offshore structures. In some applications, it may not be feasible to apply the electrically conductive strips 28 in rings encircling the metallic object 38. Instead, the electrically conductive strips 28 may be arranged in a grid formation, as shown generally at 110 in FIG. 12 and FIG. 13. As with system 10 applied to a pipe, system 110 comprises an insulating layer 34 applied over a surface of a metallic object 38 with a covering anode 26, 27 applied over the insulating layer 34. Any number of electrically conductive strips 28 may be included in the covering anode 26, 27 to effect a grid with square or rectangular subsections of any size.

In this system 110, the electron source 18 monitors each of the wires 53 for current indicative of a defect in the insulating layer 34 and covering anode 26, 27. When a defect such as a crack or other damage occurs in the insulating layer 34 and covering anode 26, 27, electrolyte may contact the metallic object 38. The electrolyte completes an electrochemical cell between the metallic object 38 and the covering anode 26, 27. Current from the electron source 18 may flow between the metallic object 38 and the covering anode 26, 27 through the electrically conductive strips 28 which are connected to the electron source 18. The electrically conductive strips 28 may be connected to the electron source 18 via wires 53. If the electron source 18 detects current in one or more of the electrically conductive strips 28, it may determine that there is at least one defect in the insulating layer 34 and covering anode 26, 27.

The system 110 may be further configured to locate damage to the insulating layer 34 and covering anode 26, 27. The electron source 18 may measure the current travelling through each of the wires 53 and, based on the relative current measured in each wire 53-1, 53-2, 53-3 . . . 53-n, generate location information at a processor 24. Due to the electrical resistance of the covering anode 26, the proximity of an electrically conductive strip 28 to the defect is correlated with the strength of the current measured in the corresponding wire 53.

The location of a defect may be expressed as x-y coordinates where the x-coordinate corresponds with a first electrically conductive strip and the y-coordinate corresponds with a second electrically conductive strip. The first electrically conductive strip is selected as having the highest measured current from a set of electrically conductive strips aligned in the y direction, and the second electrically conductive strip is selected as having the highest measured current from among a set of electrically conductive strips aligned in the x direction. When the location is expressed as an x-y coordinate, the defect is located in a region near the intersection between the first and second electrically conductive strips.

In some embodiments, the location information may be expressed as a subsection of the grid bounded by two electrically conductive strips aligned in the y direction and two electrically conductive strips aligned in the x direction. The processor 24 may be configured to select the two wires aligned in the y direction that have the first and second highest measured current relative to the set of wires aligned in the y direction. Similarly, the processor 24 may be configured to select the two wires aligned in the x direction that have the first and second highest measured current relative to the set of wires aligned in the x direction. For ease of use, the processor 24 may be further programmed to assign a unique identifier to each subsection in the grid. For example, each subsection of the grid may be labelled with a number or letter or a combination of numbers or letters. In this example, the location information may be expressed as the identifier corresponding to the subsection of the grid where the defect is located.

The processor 24 may further include an indicator 25 for displaying the location information. The indicator 25 may include LEDs or LCDs but the indicator 25 is not particularly limited. The location information may be expressed as a subsection of the grid. For example, the location of damage could be expressed as coordinates for a subsection of the grid, or the location could be displayed in a diagram or 3D model of the metallic object 38 or as a live digital twinning concept.

Although the system 110 has been described above with respect to a single defect, the system 110 may be configured to detect and locate two or more defects. If two or more electrically conductive strips 28 are transmitting more current than respective adjacent strips, the processor 24 may determine that two or more defects are present in the insulating layer 34 and covering anode 26, 27. In order to detect the location of two or more defects, the processor 24 may be configured to compare the measured current at one time point with the measured current at a previous time point.

The electron source 18 may be configured to detect current in the metallic object 38 continuously, periodically, or on-demand. For instance, the electron source 18 may be programmed to detect current transmitted by the wires 53 on an hourly, daily, or weekly basis. In another example, the electron source 18 may detect current transmitted by the wires 53 only when directed by a user. Note that the electron source 18 may apply current to the system 110 on a continuous basis or intermittently.

Figure 14:
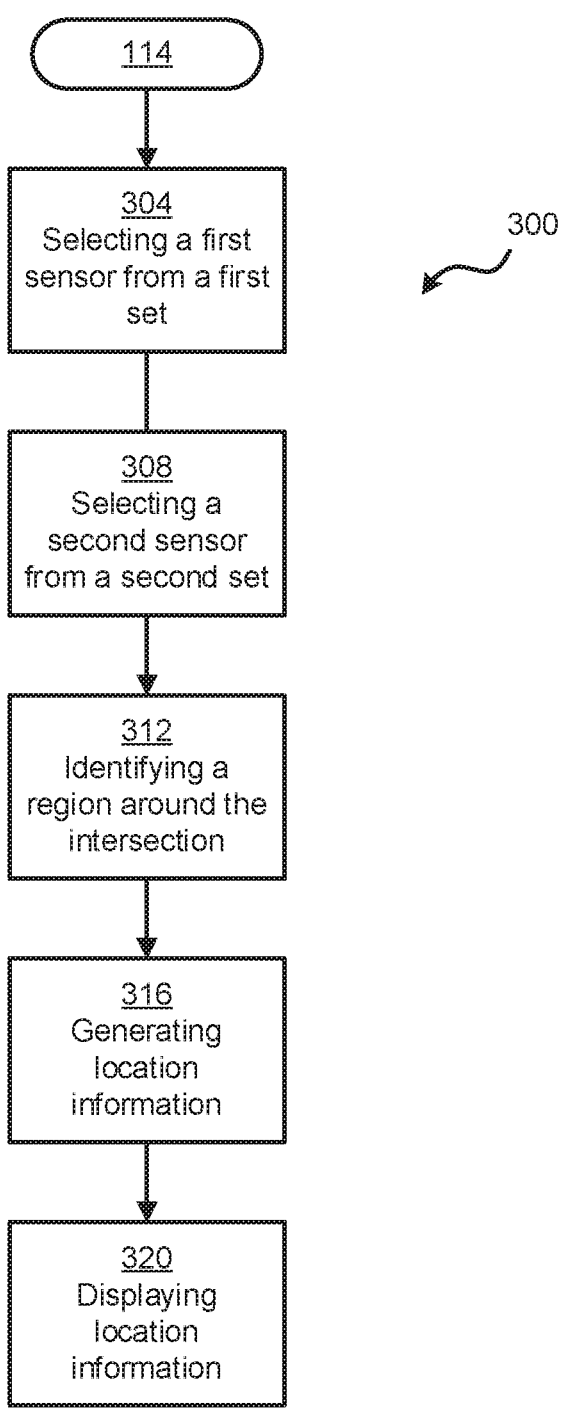
FIG. 14 is a flowchart of another method for locating a defect to a coating on a metallic object.

FIG. 14 shows a method 300 of locating defects to the insulating layer 34 and the covering anode 26, 27 of the system 110. The method 300 shown in FIG. 14 can be performed in any system such as system 110 where a first set of sensors is aligned in one direction and a second set of sensors is aligned in a perpendicular direction such that the first and second set of sensors intersect. The sensors may comprise elongate members such as electrically conductive strips 28. Blocks 304 to 320 are performed by the processor 24 in response to detecting that there is a defect at block 114 of method 100. The locating function depicted in blocks 304 to 320 is performed based on the relative current received from the sensors. At block 304, the processor 24 selects a first sensor from the first set of sensors. Block 304 comprises identifying the sensor from amongst the first set of sensors that conducts the highest current. At block 308, the processor selects a second sensor from the second set of sensors. Block 308 comprises identifying the sensor from amongst the second set of sensors that conducts the highest current. At block 312, the processor identifies a region around an intersection between the first and second sensors The location of the defect is within this region. At block 316, the processor 24 generates location information representing the location of the defect. At block 320, the processor 24 controls the indicator 25 to display the location information.

The location of a defect may be expressed as x-y coordinates where the x-coordinate corresponds with a first sensor and the y-coordinate corresponds with a second sensor. The first sensor is selected as having the highest measured current from a set of sensor aligned in the y direction, and the second sensor is selected as having the highest measured current from among a set of electrically conductive sensors aligned in the x direction. When the location is expressed as an x-y coordinate, the defect is located in a region near the intersection between the first and second sensors.

In some embodiments, the location information may be expressed as a subsection of the geometrically patterned array layout bounded by two sensors aligned in the y direction and two sensors aligned in the x direction. The processor 24 may be configured to select the two sensors aligned in the y direction that have the first and second highest measured current relative to the set of sensors aligned in the y direction. Similarly, the processor 24 may be configured to select the two sensors aligned in the x direction that have the first and second highest measured current relative to the set of sensors aligned in the x direction.

Figure 15:
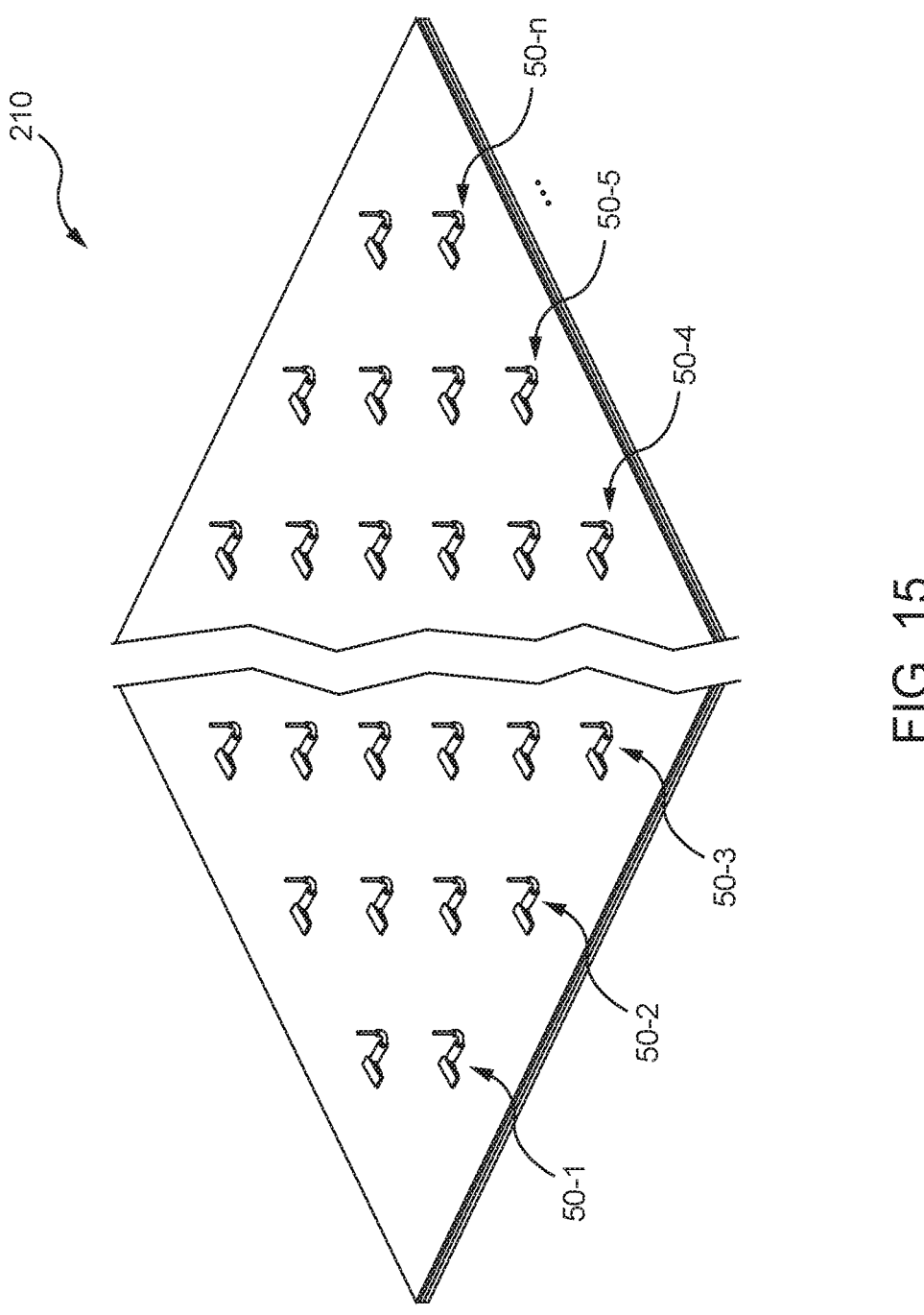
FIG. 15 is perspective view of another system for detecting and locating a defect in a coating on a metallic object.
Figure 16:
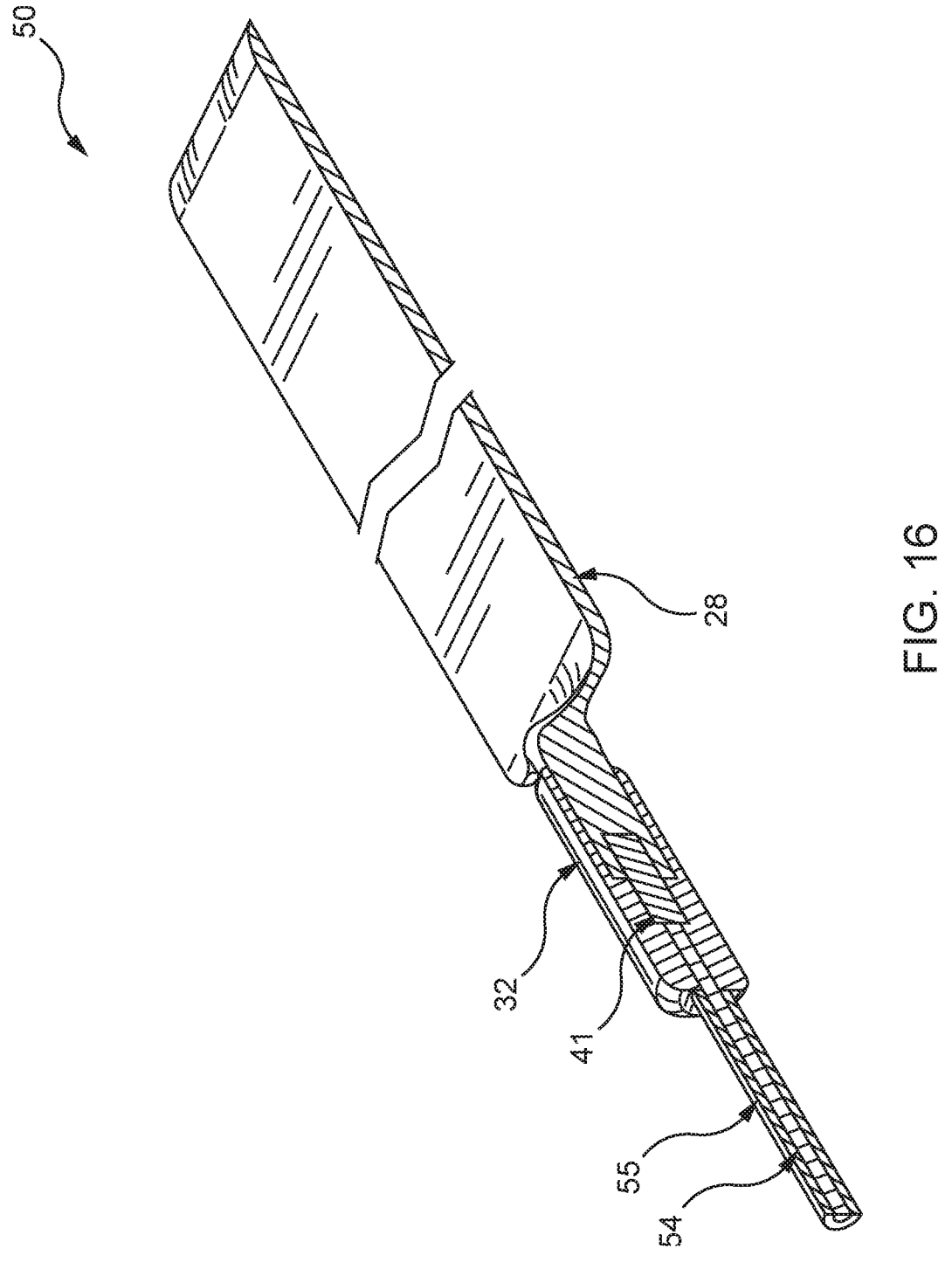
FIG. 16 is a perspective view of the sensor of FIG. 15.
Figure 17:
FIG. 17 is a top view of the sensor of FIG. 15.
Figure 17:
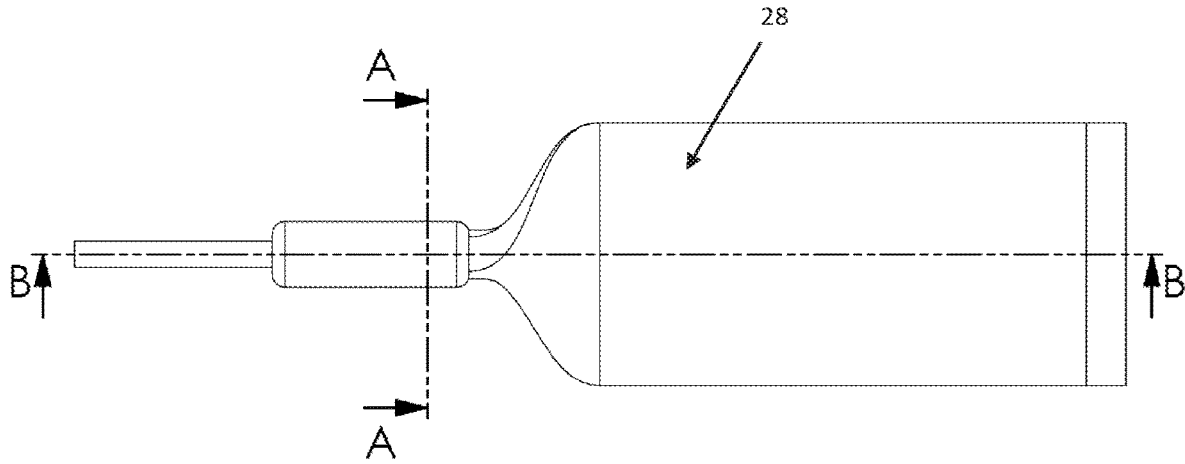
Figure 18:
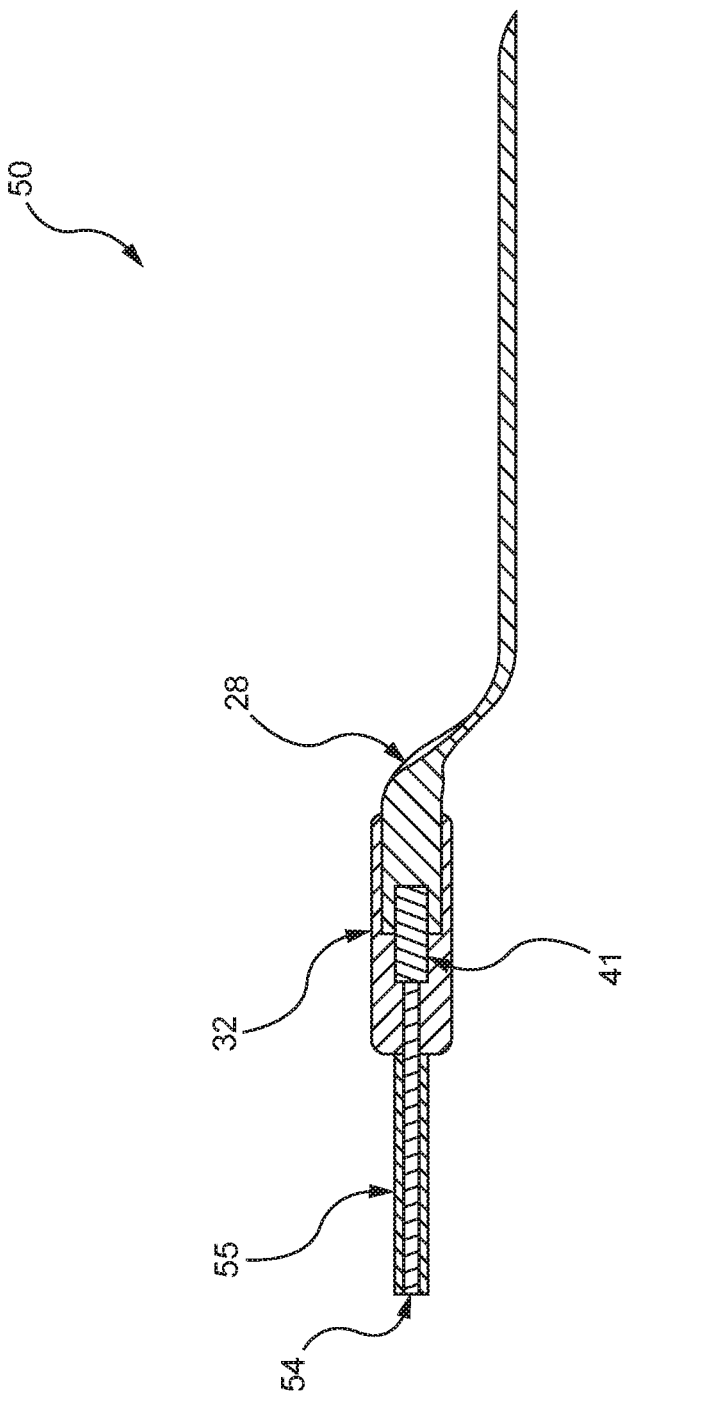
FIG. 18 is a cross-section of the sensor of FIG. 15 at B-B.
Figure 19:
FIG. 19 is a cross-section of the sensor of FIG. 16 at A-A.
Figure 19:
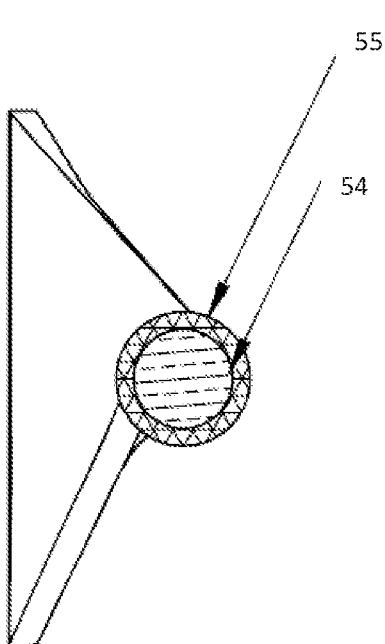

The sensors need not be elongated. FIG. 15 shows another system 210 for locating and detecting damage to a coating on a metallic object. In the system 210, sensors 50-1, 50-2, 50-3 . . . 50-*n* (herein referred to generally as "sensor 50" and collectively as "sensors 50") comprising electrically conductive strips 28 are embedded in the covering anode 26, 27 in a geometrically patterned array across the surface of the metallic object 38.

The system 210 can be used for the industries or applications that need more accuracy for locating the defects. Due to the nature of the electrical conductivity of the covering anode 26, 27, the discreteness and layout of the sensors enables system 210 to locate the defects more accurately, even within a few centimeters apart.

As with system 10 applied to a pipe, system 210 comprises an insulating layer 34 applied over a surface of a metallic object 38 with a covering anode 26, 27 applied over the insulating layer 34. Any suitable number of sensors 50 may be included in the covering anode 26, 27.

In this system 210, the electron source 18 monitors each of the wires 53 for current indicative of a defect in the insulating layer 34 and covering anode 26, 27. When a defect such as a crack, chip, scrape, or the like occurs in the insulating layer 34 and covering anode 26, 27, electrolyte may contact the metallic object 38. The electrolyte completes an electrochemical cell between the metallic object 38 and the covering anode 26, 27. Current from the electron source 18 may flow from the electrically conductive strips 28 of the sensors 50 to the covering anode 26, 27, through the electrolyte and into the metallic object 38 before returning to the electron source 18. The sensors 50 comprising electrically conductive strips 28 may be connected to the electron source 18 via wires 53. If the electron source 18 detects current in one or more of the sensors 50, it may determine that there is at least one defect in the insulating layer 34 and covering anode 26, 27.

The system 210 may be further configured to locate damage to the covering anode 26, 27 and the insulating layer 34. The electron source 18 may measure the current transmitted through each of the wires 53 and, based on the relative current measured in each wire 53, generate location information at a processor 24. Due to the electrical resistance of the covering anode 26, 27, the proximity of a sensor 50-1, 50-2, 50-3, . . . 50-*n* to the defect is correlated with the strength of the current measured in the corresponding wire 53 connected to the sensor as shown in FIG. 15.

Figure 20:
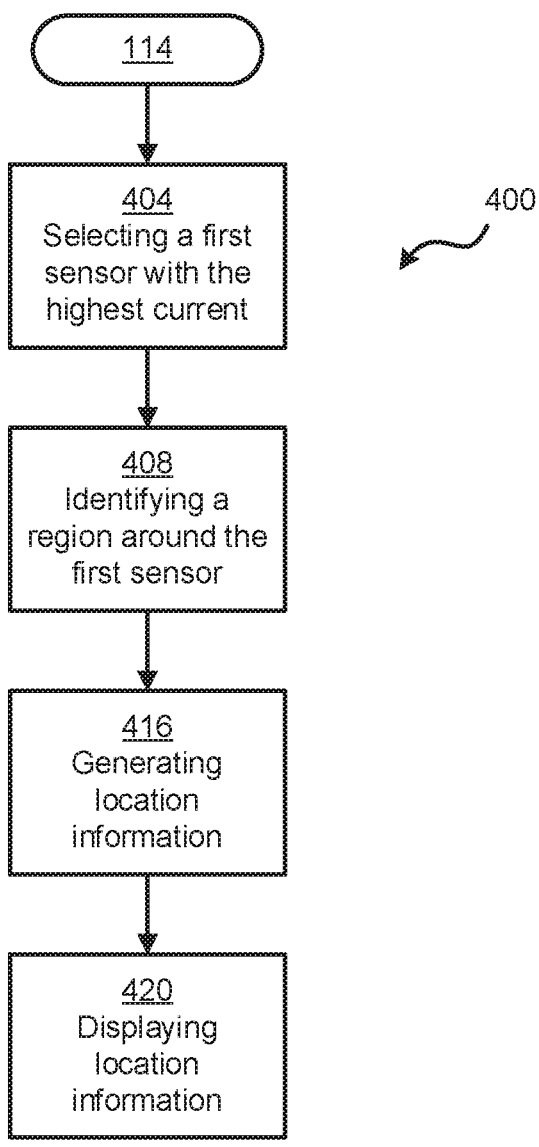
FIG. 20 is a flowchart of another method for locating a defect to a coating on a metallic object.

FIG. 20 shows a method 400 of locating defects to the insulating layer 34 and the covering anode 26, 27 of system 210. Method 400 shown in FIG. 20 can be performed in any system such as system 210 of FIG. 15 where the electrically conductive strips 28 are not elongated. Blocks 404 to 420 are performed by the processor 24 in response to detecting that there is a defect at block 114 of method 100. The locating function depicted in blocks 404 to 420 is performed based on the relative current transmitted through the sensors 50. At block 404, the processor 24 selects a first sensor 50 from a plurality of sensors 50 as the sensor 50 that draws the highest current. At block 408, the processor 24 identifies a region around the sensor 50 as the location of the defect. At block 416, the processor 24 generates location information representing the location of the defect. At block 420, the processor 24 controls the indicator 25 to display the location information.

The location of a defect may be expressed as x-y coordinates where the x- and y-coordinates correspond with the location of the first sensor 50. The first sensor 50 is selected as transmitting the highest measured current from a set of sensors 50. When the location is expressed as an x-y coordinate, the defect is located in a region proximate to the first sensor 50.

For ease of use, the processor 24 may be further programmed to assign a unique identifier to each sensor 50. For example, each sensor may be assigned a number or letter or a combination of numbers or letters. In this example, the location information may be expressed as the identifier corresponding to sensor 50 nearest to the defect.

The processor 24 may determine the location of the defect based on three or more sensors 50. In some implementations, the processor 24 may select the three sensors conducting the highest current and triangulate the location of the defect using the locations of the three sensors 50. In other implementations, the processor 24 may select the four sensors conducting the highest current and locate the defect using the locations of the four sensors 50.

The processor 24 may further include an indicator 25 for displaying the location information. The indicator 25 may include LEDs or LCDs but the indicator 25 is not particularly limited. The location information may be expressed as a region in proximity to a sensor 50. In one example, the location could be displayed in a diagram or 3D model of the metallic object 38 or as a live digital twinning concept.

Although the system 210 has been described above with respect to a single defect, the system 210 may be configured to detect and locate two or more defects. If two or more sensors 50 are transmitting more current than respective adjacent sensors, the processor 24 may determine that two or more defects are present in the insulating layer 34 and covering anode 26, 27. In order to detect the location of two or more defects, the processor 24 may be further configured to compare the measured current at one time point with the measured current at a previous time point.

The electron source 18 may be configured to detect current in the metallic object 38 continuously, periodically, or on-demand. For instance, the electron source 18 may be programmed to detect current transmitted by the wires 53 on an hourly, daily, or weekly basis. In another example, the electron source 18 may apply current to the metallic object 38 and detect current transmitted by the wires 53 only when directed by a user. Note that the electron source 18 may apply current to the system 210 on a continuous basis or intermittently.

FIGS. 16-19 show the sensor 50 of FIG. 15. The sensor 50 comprises the electrically conductive strip 28. The electrically conductive strip 28 may be any suitable size or shape. It is contemplated that the electrically conductive strip will have a thickness that is suitable for embedding the electrically conductive strip 28 in the covering anode 26, 27. The sensor 50 further comprises an electrical connector 32 to electrically connect the electrically conductive strip 28 to the electrically conductive core 54 of the wire 53. The wire 53 has an electrically isolating cover 55. The electrical connector is covered by another electrically isolating cover 55.

As the capillary action due to the nature of the electrically conductive strip 28 may suck the electrolyte into the electrical connector 32, in addition to the technique to prevent capillary action, as described above, the electrical connector 32 may comprise a nonmetallic material that is either electrically conductive or nonconductive. If it is nonconductive, extra caution should be made to ensure contact between the electrically conductive core 54 of the wire 53, graphite rod, and the electrically conductive strip 28 described in FIG. 16.

The systems described above provide a number of advantages over the prior art systems. Primarily, it provides the ability to detect and locate defects to a coating on a metallic object, that exposes substrate surfaces to degradation from corrosion without visual inspection. Damage that is minor or not yet visible can be detected and repaired before the problem is exacerbated and cause corrosion to the metallic object. Even damage that occurs beneath a topcoat such a layer of, insulation, or sealant can be detected through the disclosed systems and methods. Because the systems do not rely on visual inspection, detection can occur remotely. This feature may be particularly beneficial for pipelines and other remote infrastructure where human presence is not always feasible. Similarly, the systems may be useful for detecting damage to metallic objects that are located underground or underwater, such as marine vessels, marine infrastructure, pipes, and offshore oil rigs. Moreover, detection and location may be performed in real-time. These advantages are combined with the benefits of a covering anode ICCP system to actively prevent corrosion to the metallic object.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A system for detecting defects to a coating on a metallic object, the system comprising:

an electrically insulating coating disposed on at least a portion of the metallic object;

a covering anode applied on at least a portion of the electrically insulating coating, the covering anode configured to conduct electricity;

a plurality of sensors electrically connected to the covering anode, the plurality of sensors comprising a set of electrically conductive strips, wherein a first set of the plurality of sensors is aligned in a first direction and a second set of the plurality of sensors is aligned in a second direction perpendicular to the first direction;

an electron source electrically connected to the metallic object and the plurality of sensors, the electron source configured to apply current to the metallic object and receive current through at least one of the plurality of sensors when there is a defect in the covering anode and the electrically insulating coating that permits an electrolyte to complete an electric circuit from the electron source through the covering anode to the metallic object and returning to the electron source; and a processor electrically connected to the electron source and configured to:

measure current transmitted through the electric circuit via the plurality of sensors when current is applied to the metallic object;

select a first sensor from the first set of electrically conductive strips, the first sensor conducting a highest first current relative to said first set of sensors;

select a second sensor from the second set of electrically conductive strips, the second sensor conducting a highest second current relative to said second set of sensors; and locate a defect in the covering anode and electrically insulating coating based on a sensor of the plurality of sensors conducting a highest current through the electric circuit in a region around an intersection of the first sensor and the second sensor.

2. The system of claim 1:

wherein the processor is programmable with locations of the electrically conductive strips; and wherein the processor is further configured to generate location information based on a location of the defect, wherein the location information is expressed relative to the location of the electrically conductive strip conducting the highest current.

3. The system of claim 2 further comprising an indicator, wherein the processor is further configured to output location information via the indicator.

4. The system of claim 2, wherein the processor is programmable for different currents, voltages, and arrangements of the electrically conductive strips.

5. The system of claim 2, wherein at least a subset of the electrically conductive strips encircles the metallic object.

6. The system of claim 2, wherein the electrically conductive strips are arranged to form a grid.

7. The system of claim 2, wherein the electrically conductive strips are arranged in a geometrically patterned array.

8. The system of claim 1, further comprising a topcoat disposed over at least a portion of the covering anode.

9. The system of claim 1, further comprising a topcoat disposed over at least a portion of the electrically conductive strips.

10. The system of claim 1, wherein the electrically insulating coating and the covering anode are disposed on two sides of the metallic object.

11. The system of claim 1, wherein the electrically conductive strips comprise carbon fiber fabric.

12. The system of claim 11 further comprising a plurality of graphite members, each graphite member electrically connected to one of the electrically conductive strips and the electron source.

13. A method for detecting and locating coating barrier failure on metallic objects, the method comprising:

(i) applying current from an electron source to a metallic object;

(ii) measuring at the electron source a current transmitted through a plurality of sensors, the plurality of sensors embedded in a covering anode which covers at least a portion of an electrically insulating coating applied over the metallic object, the plurality of sensors comprising a set of electrically conductive strips, wherein a first set of the plurality of sensors is aligned in a first direction and a second set of the plurality of sensors is aligned in a second direction perpendicular to the first direction;

iii) when no current is detected, determining at a processor connected to the electron source that the covering anode and the electrically insulating coating have no defects; and (iv) when current is detected:

determining at the processor that the covering anode and the electrically insulating coating have a defect, the defect permitting an electrolyte to electrically connect the covering anode to the metallic object; and selecting a first sensor from the first set of electrically conductive strips, the first sensor conducting a highest first current relative to said first set of sensors;

selecting a second sensor from the second set of electrically conductive strips, the second sensor conducting the highest second current relative to said second set of sensors; and locating the defect in the covering anode and the electrically insulating coating based on a first sensor of the plurality of sensors conducting a highest current in a region around an intersection of the first sensor and the second sensor.

14. The method of claim 13 further comprising:

measuring a first current conducted by the first sensor;

storing in memory at the processor, the first current; and repeating (i) to (iv);

measuring a second current conducted by the first sensor;

storing in memory at the processor, the second current; and comparing the first and second current to determine whether the defect has worsened.

15. The method of claim 13, wherein the processor is programmed with locations for the plurality of sensors, the method further comprising:

generating at the processor location information that is expressed relative to the location of the first sensor.

16. The method of claim 13 wherein each of the sensors encircles the metallic object, the method further comprising:

selecting a third sensor from the first set of electrically conductive strips, the third sensor conducting a second highest first current relative to said first set of sensors;

identifying a sub-region between the first sensor and the third sensor as the location of the defect.

17. The method of claim 13 further comprising:

selecting the first sensor conducting the highest first current;

selecting a second sensor conducting highest second current;

selecting a third sensor conducting a highest third current; and locating the defect based on locations of the first, second, and third sensors.

18. The method of claim 13 further comprising:

selecting the first sensor conducting more current than two sensors nearest to the first sensor;

selecting a third sensor from the first set of electrically conductive strips, the third sensor conducting more current than two sensors nearest to the third sensor;

determining that the covering anode and the electrically insulating coating have at least a first defect and a second defect;

identifying a first sub-region around the first sensor as a location of the first defect; and identifying a second sub-region around the third sensor as a location of the second defect.

* * * * *